United States Patent
Okuyama et al.

(10) Patent No.: US 11,961,683 B2
(45) Date of Patent: Apr. 16, 2024

(54) BIAXIALLY STRETCHED POLYPROPYLENE FILM, METALLIZED FILM, METALLIZED FILM ROLL AND FILM CAPACITOR

(71) Applicant: Oji Holdings Corporation, Tokyo (JP)

(72) Inventors: Yoshimune Okuyama, Tokyo (JP); Takeshi Tominaga, Tokyo (JP); Yoshikazu Fujishiro, Tokyo (JP); Tadakazu Ishiwata, Tokyo (JP)

(73) Assignee: Oji Holdings Corporation, Tokyo (JP)

( * ) Notice: Subject to any disclaimer, the term of this patent is extended or adjusted under 35 U.S.C. 154(b) by 552 days.

(21) Appl. No.: 17/261,826

(22) PCT Filed: Aug. 28, 2019

(86) PCT No.: PCT/JP2019/033774
§ 371 (c)(1),
(2) Date: Jan. 20, 2021

(87) PCT Pub. No.: WO2020/045523
PCT Pub. Date: Mar. 5, 2020

(65) Prior Publication Data
US 2021/0291427 A1    Sep. 23, 2021

(30) Foreign Application Priority Data

Aug. 29, 2018 (JP) .................................. 2018-160107
Aug. 22, 2019 (JP) .................................. 2019-152388
Aug. 28, 2019 (JP) .................................. 2019-155265

(51) Int. Cl.
*H01G 4/32* (2006.01)
*B29C 55/12* (2006.01)
*H01G 4/18* (2006.01)

(52) U.S. Cl.
CPC ............... *H01G 4/32* (2013.01); *B29C 55/12* (2013.01); *H01G 4/18* (2013.01); *C08L 2203/16* (2013.01); *C08L 2203/20* (2013.01)

(58) Field of Classification Search
None
See application file for complete search history.

(56) References Cited

U.S. PATENT DOCUMENTS 5,724,222 A    3/1998  Hirano et al.
2017/0229243 A1*  8/2017  Nakata .................... B32B 3/30
2019/0315047 A1  10/2019  Tominaga et al.

FOREIGN PATENT DOCUMENTS

CN    1154374 A    7/1997
CN    102029709 A  4/2011
(Continued)

OTHER PUBLICATIONS

Office Action issued in European Patent Application No. 19 853 573.4, dated Dec. 21, 2022.
(Continued)

*Primary Examiner* — Eric W Thomas
(74) *Attorney, Agent, or Firm* — Knobbe, Martens, Olson & Bear, LLP

(57) ABSTRACT

A biaxially stretched polypropylene film which has a thickness of from 1.0 μm to 3.5 μm, a tensile fracture stress at 135° C. of 70 MPa or more in a first direction, and a difference between the tensile fracture stress at 125° C. in the first direction and the tensile fracture stress at 135° C. in the first direction of from 0 MPa to 15 MPa (inclusive).

16 Claims, 3 Drawing Sheets

(56) References Cited

FOREIGN PATENT DOCUMENTS

| JP | S 63310954 A | | 12/1988 |
|---|---|---|---|
| JP | 2014231584 A | * | 12/2014 |
| WO | WO 2018/124300 A1 | | 7/2018 |

OTHER PUBLICATIONS

International Search Report in International Application No. PCT/JP2019/033774 dated Oct. 21, 2019.
Extended European Search Report in European Patent Application No. 19853573.4 dated Sep. 17, 2021.
Office Action issued in corresponding Chinese Patent Application No. 201980055296.8, dated Jul. 4, 2022.

* cited by examiner

BIAXIALLY STRETCHED POLYPROPYLENE FILM, METALLIZED FILM, METALLIZED FILM ROLL AND FILM CAPACITOR

CROSS-REFERENCE TO RELATED APPLICATIONS

This application is the U.S. National Phase under 35 U.S.C. § 371 of International Application PCT/JP2019/033774, filed Aug. 28, 2019, designating the U.S., and published in Japanese as WO 2020/045523 on Mar. 5, 2020 which claims priority to Japanese Patent Application No. 2018-160107, filed Aug. 29, 2018; Japanese Patent application No. 2019-152388, filed Aug. 22, 2019; and Japanese Patent Application No. 2019-155265, filed Aug. 28, 2019, the entire contents of which are incorporated herein by reference.

TECHNICAL FIELD

The present disclosure relates to a biaxially stretched polypropylene film, a metallized film, a metallized film roll, and a film capacitor.

BACKGROUND ART

Biaxially stretched polypropylene films exhibit excellent electric characteristics such as high dielectric strength and low dielectric loss and high moisture resistance and thus are used as a dielectric material for film capacitors. For example, biaxially stretched polypropylene films are used as a dielectric material for film capacitors in inverters that constitute power control units of hybrid vehicles and electric vehicles.

As illustrated in FIG. 1, a metallized film 5 constituting a film capacitor includes a biaxially stretched polypropylene film 10 and a metal layer 30 provided on the biaxially stretched polypropylene film 10. The metal layer 30 is provided on one of the two surfaces of the biaxially stretched polypropylene film 10. FIG. 1 is a sectional view taken along line I-I in FIG. 2.

As illustrated in FIG. 2, in the metallized film 5, an insulation margin 21 that continuously extends in a MD direction D1 is provided at one end portion 51 in a TD direction D2. Usually, the insulation margin 21 is formed by covering a predetermined position of the biaxially stretched polypropylene film 10 with oil before the biaxially stretched polypropylene film 10 is subjected to metal deposition. Reference numeral 52 denotes the other end portion of the metallized film 5 in the TD direction D2, reference numeral 31 denotes a heavy edge portion, and reference numeral 32 denotes an active portion.

In order to fabricate such a metallized film 5, for example, a molten polypropylene resin is extruded into a sheet using a T-die to obtain a cast roll stock sheet, the cast roll stock sheet is biaxially stretched to obtain a biaxially stretched polypropylene film, the biaxially stretched polypropylene film is unwound, sprayed with oil, and subjected to metal deposition, and a metallized film before slit 6 (see FIG. 3) is wound around a take-up roll (hereinafter, this may be referred to as "deposition process"). As illustrated in FIG. 3, a metallized film before slit 6 has a plurality of insulation margins 21 that continuously extend in the MD direction D1. Such a metallized film before slit 6 can be divided into a plurality of sheets in the TD direction D2 using a cutting blade while being unwound to obtain the metallized film 5. In the deposition process, oil at 100° C. to 150° C. is sprayed toward the biaxially stretched polypropylene film. The metal for metal deposition is an evaporation source and is usually heated to 600° C. or more. The biaxially stretched polypropylene film 10 after being sprayed with oil is allowed to pass through between the evaporation source and the cooling roll for metal deposition. In FIG. 3, reference numeral 300 denotes the metal layer of the metallized film before slit 6 formed by deposition.

PRIOR ART DOCUMENT

Patent Document

Patent Document 1: JP-A-63-310954

SUMMARY OF THE INVENTION

Problems to be Solved by the Invention

In the deposition process, the biaxially stretched polypropylene film may cause heat defeat (wrinkling, sagging) by the influence of heat received from oil for insulation margin formation, deposited metal, and evaporation source. This heat defeat may cause wrinkling when the metallized film before slit which has been subjected to deposition is wound or may cause the deposited film unevenness due to wrinkling and sagging. The generation of defects due to heat defeat, specifically, the generation of wrinkle defects and the deposited film unevenness is remarkable particularly in thin biaxially stretched polypropylene films such as biaxially stretched polypropylene films for capacitors. Since such defects adversely affects the subsequent processes (slit process, capacitor element winding process, film capacitor fabricating process, and the like), the defective part is discarded.

Meanwhile, since film capacitors are used in hybrid vehicles and electric vehicles, it is desirable that film capacitors hardly cause a decrease in capacitance and short-circuits even in a harsh environment of high temperature and high voltage.

An object of the present disclosure is to provide a biaxially stretched polypropylene film in which it is possible to suppress wrinkle defects in the wound shape after the deposition process and the generation of deposited film unevenness despite a thin thickness of the biaxially stretched polypropylene film and from which it is possible to fabricate a film capacitor in which the decrease in capacitance with elapsed time is small and the time until a short circuit is caused is long in two marginal tests (temperature marginal test and voltage marginal test).

Means for Solving the Problems

The biaxially stretched polypropylene film of the present disclosure has a thickness of from 1.0 µm to 3.5 µm, a tensile fracture stress of 70 MPa or more at 135° C. in a first direction, and a difference between the tensile fracture stress at 125° C. in the first direction and the tensile fracture stress at 135° C. in the first direction of 0 MPa or more and 15 Mpa or less.

In the biaxially stretched polypropylene film of the present disclosure, it is possible to suppress the generation of wrinkle defects in the wound shape after the deposition process and the generation of deposited film unevenness despite a thin thickness of the biaxially stretched polypropylene film. From the biaxially stretched polypropylene film of the present disclosure, it is possible to fabricate a film capacitor in which the decrease in capacitance with elapsed time is small and the time until a short circuit is caused is long in two marginal tests (temperature marginal test and voltage marginal test). The capacitance of the film capacitor and the capacitance per unit volume are great since the thickness of the biaxially stretched polypropylene film is thin.

The reason why it is possible to suppress the generation of wrinkle defects in the wound shape after the deposition process and the generation of deposited film unevenness is presumed as follows.

It is considered that the main cause by which wrinkle defects in the wound shape after the deposition process and deposited film unevenness may have been conventionally caused is first that the temperature rises at the part where the oil for insulation margin formation is attached and the part easily extends in the MD direction by the tension at the time of transportation but the other parts (parts where oil is not attached) hardly extend and second that the film temperature is higher because of the heat received from the deposited metal which is attached or evaporation source as the biaxially stretched polypropylene film is closer to the deposition source when the biaxially stretched polypropylene film passes near the deposition source and thus the part near the evaporation source easily extends in the MD direction by the tension at the time of transportation but the part far from the evaporation source hardly extends.

On the other hand, in the biaxially stretched polypropylene film of the present disclosure, it is considered that it is possible to suppress wrinkle defects in the wound shape and deposited film unevenness which may have been conventionally caused by the temperature variation (the temperature is high at the part where oil is attached and the temperature is low at the part where oil is not attached) due to the oil for insulation margin formation and rapid temperature changes of the biaxially stretched polypropylene film due to the attachment of deposited metal and the heat received from the deposition source. This will be described in detail below.

First, in the biaxially stretched polypropylene film of the present disclosure, it is considered that it is possible to suppress wrinkle defects in the wound shape and deposited film unevenness which may have been conventionally caused by the temperature variation (the temperature is high at the part where oil is attached and the temperature is low at the part where oil is not attached) due to the oil for insulation margin formation.

As described above, the reason why the wrinkle defects and the deposited film unevenness can be suppressed is first that it is possible to prevent the part where the oil for insulation margin formation is attached from extending in the MD direction by the tension at the time of transportation since the tensile fracture stress at 135° C. in the first direction is 70 MPa or more. The next reason is that it is possible to diminish the variation in strength in the TD direction based on the temperature plane of the biaxially stretched polypropylene film and thus to suppress the variation in MD direction elongation in the TD direction since the difference between the tensile fracture stress at 125° C. in the first direction and the tensile fracture stress at 135° C. in the first direction is 0 MPa or more and 15 MPa or less.

In the biaxially stretched polypropylene film of the present disclosure, it is considered that the transportation in the deposition process can be stabilized by both of that it is possible to prevent the part where the oil for insulation margin formation is attached from extending in the MD direction and that it is possible to suppress the variation in MD direction elongation in the TD direction as described above.

As a result, in the biaxially stretched polypropylene film of the present disclosure, it is considered that it is possible to suppress wrinkle defects in the wound shape and deposited film unevenness which may have been conventionally caused by the temperature variation due to the oil for insulation margin formation.

Second, in the biaxially stretched polypropylene film of the present disclosure, it is considered that it is possible to suppress wrinkle defects in the wound shape and deposited film unevenness which may have been conventionally caused by rapid temperature changes of the biaxially stretched polypropylene film due to the attachment of deposited metal and the heat received from the deposition source.

As described above, the reason why it is possible to suppress the wrinkle defects and the deposited film unevenness is first that it is possible to prevent the biaxially stretched polypropylene film from extending in the MD direction by the tension at the time of transportation when the biaxially stretched polypropylene film receives heat from the deposited metal which is attached in the metal deposition process or the evaporation source since the tensile fracture stress at 135° C. in the first direction is 70 MPa or more. The next reason is that it is possible to diminish the variation in strength based on the temperature changes and thus to suppress the variation in MD direction elongation by the tension at the time of transportation since the difference between the tensile fracture stress at 125° C. in the first direction and the tensile fracture stress at 135° C. in the first direction is 0 MPa or more and 15 MPa or less.

In the biaxially stretched polypropylene film of the present disclosure, it is considered that the transportation in the deposition process can be stabilized by both of that it is possible to prevent the biaxially stretched polypropylene film from extending in the MD direction by the heat received from the deposited metal or evaporation source and that it is possible to suppress the variation in MD direction elongation based on the temperature changes as described above.

As a result, in the biaxially stretched polypropylene film of the present disclosure, it is considered that it is possible to suppress wrinkle defects in the wound shape and deposited film unevenness which may have been conventionally caused by rapid temperature changes of the biaxially stretched polypropylene film due to the attachment of deposited metal and the heat received from the deposition source.

By such a principle, in the biaxially stretched polypropylene film of the present disclosure, it is considered that it is possible to suppress wrinkle defects in the wound shape and deposited film unevenness which may have been conventionally caused by the temperature variation due to the oil for insulation margin formation and rapid temperature changes of the biaxially stretched polypropylene film due to the attachment of deposited metal and the heat received from the deposition source despite a thin thickness.

On the other hand, in Patent Document 1, although it is disclosed that the rigidity is enhanced and wrinkling at the time of deposition is suppressed, not only the rigidity of the biaxially stretched polypropylene film at a high temperature has not been investigated but also the strength of the rigidity with respect to the temperature variation at a high temperature and temperature change has not been investigated. The thickness of the biaxially stretched polypropylene film is also thick, and a thin film has not been investigated. Hence, in the biaxially stretched polypropylene film of Patent Document 1, it is considered that it is difficult to suppress both wrinkle defects in the wound shape of the thin film and the deposited film unevenness in some cases.

The reason why it is possible to fabricate a film capacitor in which the decrease in capacitance with elapsed time is small and the time until a short circuit is caused is long in two marginal tests (temperature marginal test and voltage marginal test) from the biaxially stretched polypropylene film of the present disclosure is presumed as follows.

First, it is considered that the internal structure of the biaxially stretched polypropylene film of the present disclosure is firm even at high temperatures (specifically, 115° C. in the temperature marginal test and 105° C. in the voltage marginal test) since the tensile fracture stress at 135° C. in the first direction is 70 MPa or more.

Second, since the difference between the tensile fracture stress at 125° C. in the first direction and the tensile fracture stress at 135° C. in the first direction is 0 MPa or more and 15 MPa or less and the change in tensile fracture stress is small with respect to the temperature change, the internal structure is hardly collapsed by heating to increase the temperature to the test temperatures (specifically, 115° C. in the temperature marginal test and 105° C. in the voltage marginal test) in the temperature marginal test and voltage marginal test. As a result, in the biaxially stretched polypropylene film of the present disclosure, it is considered that it is possible to suppress a decrease in capacitance with the elapsed time and the occurrence of short circuit in the temperature marginal test and voltage marginal test.

The biaxially stretched polypropylene film of the present disclosure can be used for a capacitor.

The present disclosure also relates to a metallized film, and the metallized film of the present disclosure can include the biaxially stretched polypropylene film of the present disclosure and a metal layer laminated on one surface or both surfaces of the biaxially stretched polypropylene film.

The present disclosure also relates to a metallized film roll, and the metallized film roll of the present disclosure can be formed by winding the metallized film of the present disclosure.

The present disclosure also relates to a film capacitor, and the film capacitor of the present disclosure may include the metallized film of the present disclosure which is wound or may have a configuration in which a plurality of the metallized films of the present disclosure are laminated.

Effect of the Invention

In the biaxially stretched polypropylene film of the present disclosure, it is possible to suppress wrinkle defects in the wound shape after the deposition process and the generation of the deposited film unevenness despite a thin thickness. Moreover, from the biaxially stretched polypropylene film, it is possible to fabricate a film capacitor in which the decrease in capacitance with elapsed time is small and the time until a short circuit is caused is long in two marginal tests (temperature marginal test and voltage marginal test).

MODE FOR CARRYING OUT THE INVENTION

Figure 1:
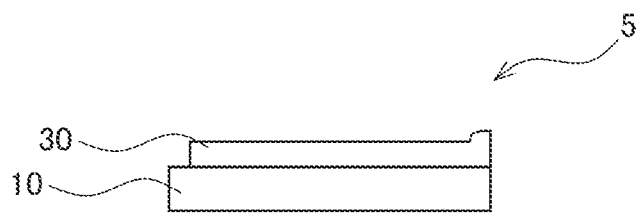
FIG. 1 is a schematic sectional view of a metallized film, and more specifically is a schematic sectional view of line I-I in FIG. 2.

Hereinafter, embodiments of the present invention will be described. However, the present invention is not limited only to these embodiments.

In the present description, the expressions "contain" and "include" involve the concepts of "contain", "include", "substantially consist of", and "consist only of".

In the present description, the expression "capacitor" includes the concepts of "capacitor", "capacitor element", and "film capacitor".

The biaxially stretched polypropylene film of the present embodiment is not a microporous film and thus does not have a large number of pores.

The biaxially stretched polypropylene film of the present embodiment may be composed of a plurality of layers of two or more layers but is preferably composed of a single layer.

In the present description, polypropylene may be abbreviated as PP and polypropylene resin may be abbreviated as PP resin.

First, the directions described in the present embodiment will be described. In the present embodiment, the first direction indicates the longitudinal direction of the biaxially stretched polypropylene film, namely, the same direction as the vertical direction. The longitudinal direction may be referred to as the roll winding direction. In the present embodiment, the first direction is also the same direction as the machine direction (hereinafter, referred to as "MD direction"). The MD direction may be referred to as the flow direction, the mechanical axis direction, or the like. In the following, the first direction is mainly referred to as the MD direction. However, the present invention is not limited to a form in which the first direction indicates the same direction as the longitudinal direction and is not limited to a form in which the first direction indicates the same direction as the MD direction. On the other hand, the second direction indicates the same direction as the width direction of the biaxially stretched polypropylene film. In the present embodiment, the second direction is also the same direction as the transverse direction (hereinafter referred to as "TD direction"). In the following, the second direction is mainly referred to as the TD direction. However, the present invention is not limited to a form in which the second direction indicates the same direction as the width direction and is not limited to a form in which the second direction indicates the same direction as the TD direction.

In the biaxially stretched polypropylene film according to the present embodiment, the tensile fracture stress at 135° C. in the first direction is 70 MPa or more, preferably 80 MPa or more, more preferably 85 MPa or more. When the tensile fracture stress of the biaxially stretched polypropylene film is less than 70 MPa, it can be said that the strength of the heat-received part with respect to tension at the time of transportation is not sufficient when the biaxially stretched polypropylene film receives heat from the oil for insulation margin formation, the deposited metal, or the deposition source. When the tensile fracture stress is less than 70 MPa, it can be said that the internal structure of the biaxially stretched polypropylene film is not sufficiently firm. The tensile fracture stress at 135° C. in the first direction is preferably 120 MPa or less, more preferably 110 MPa or less, still more preferably 105 MPa or less, particularly preferably 100 MPa or less. The reason why 120 MPa or less is preferred is that the film forming stability (difficulty of film tearing) of the biaxially stretched polypropylene film is not sufficient when the tensile fracture stress at 135° C. in the first direction is too high. In the present description, the tensile fracture stress at 135° C. may be referred to as $\sigma_{b135}$.

The tensile fracture stress ($\sigma_{b135}$) at 135° C. in the first direction can be adjusted by the MD stretching ratio. The MD stretching ratio is the ratio when the cast roll stock sheet is stretched in the MD direction. However, the tensile fracture stress ($\sigma_{b135}$) at 135° C. in the first direction is also affected by the temperature of MD preheating roll group located upstream the MD stretching roll group, the close contact time with MD preheating roll group, the temperature of MD stretching roll group, the close contact time with MD stretching roll group, the temperature of MD relaxation roll group located downstream the MD stretching roll group, and the close contact time with the MD relaxation roll group.

In the biaxially stretched polypropylene film according to the present embodiment, the difference between the tensile fracture stress at 125° C. in the first direction and the tensile fracture stress ($\sigma_{b135}$) at 135° C. in the first direction is 0 MPa or more and 15 MPa or less, preferably 3 MPa or more and 15 MPa or less, more preferably 5 MPa or more and 14 MPa or less, still more preferably 6 MPa or more and 14 MPa or less. This difference is obtained by subtracting the tensile fracture stress ($\sigma_{b135}$) at 135° C. in the first direction from the tensile fracture stress at 125° C. in the first direction. When this difference exceeds 15 MPa, the variation in strength in the TD direction based on the temperature variation due to the oil for insulation margin formation and the temperature change caused when the biaxially stretched polypropylene film passes near the evaporation source cannot be said to be sufficiently small and the internal structure is easily collapsed by heating to increase the temperature to the test temperatures (specifically, 115° C. in the temperature marginal test and 105° C. in the voltage marginal test) in the temperature marginal test and voltage marginal test. In the present description, the tensile fracture stress at 125° C. may be referred to as $\sigma_{b125}$. In the present description, the difference between the tensile fracture stress ($\sigma_{b125}$) at 125° C. in the first direction and the tensile fracture stress ($\sigma_{b135}$) at 135° C. in the first direction may be referred to as the tensile fracture stress difference and may also be referred to as $\sigma_{b125} - \sigma_{b135}$.

The tensile fracture stress difference ($\sigma_{b125} - \sigma_{b135}$) can be adjusted by the temperature of MD preheating roll group located upstream the MD stretching roll group, the close contact time with MD preheating roll group, the temperature of MD stretching roll group, the close contact time with MD stretching roll group, the temperature of MD relaxation roll group located downstream the MD stretching roll group, and the close contact time with the MD relaxation roll group. However, the tensile fracture stress difference ($\sigma_{b125} - \sigma_{b135}$) is also affected by the MD stretching ratio.

The thickness of the biaxially stretched polypropylene film according to the present embodiment is in a range of 1.0 μm to 3.5 μm. The thickness of the biaxially stretched polypropylene film according to the present embodiment is preferably 1.0 μm or more, more preferably 1.5 μm or more, still more preferably 2.0 μm or more. The thickness of the biaxially stretched polypropylene film according to the present embodiment is preferably 3.5 μm or less, more preferably 3.0 μm or less, still more preferably 2.8 μm or less. When the thickness of the biaxially stretched polypropylene film according to the present embodiment is 3.5 μm or less, the capacitance per unit volume can be increased when the biaxially stretched polypropylene film is formed into a capacitor element, and thus the biaxially stretched polypropylene film can be suitably used for a capacitor.

The capacitance per unit volume can be greater as the polypropylene film is thinner. More specifically, the capacitance C is expressed as follows using the dielectric constant ε, the electrode area S, and the dielectric thickness d (the thickness d of polypropylene film).

$$C = \varepsilon S/d$$

Here, in the case of a film capacitor, the thickness of the electrode is thinner than the thickness of the polypropylene film (dielectric) by three orders of magnitude or more, and thus the volume V of the capacitor is expressed as follows if the volume of the electrode is ignored.

$$V = Sd$$

Hence, the capacitance per unit volume C/V is expressed as follows from the above two equations.

$$C/V = \varepsilon/d^2$$

As can be seen from the above equation, the capacitance per unit volume (C/V) is inversely proportional to the square of the polypropylene film thickness. The dielectric constant ε is determined depending on the material used. Consequently, it can be seen that the capacitance per unit volume (C/V) cannot be improved but by thinning the thickness unless the material is changed.

The thickness of the biaxially stretched polypropylene film refers to a value measured using a paper thickness measuring instrument MEI-11 (measuring pressure: 100 kPa, descent speed: 3 mm/sec, measuring terminal φ=16 mm, measuring force: 20.1 N) manufactured by CITIZEN FINEDEVICE CO., LTD. in an environment of a temperature of 23° C.±2° C. and a humidity of 50%±5% RH. The sample is cut out from the roll while 10 or more sheets thereof are stacked and is handled so that the film does not wrinkle and the air does not enter the film at the time of cutting out. The measurement is performed five times for a ten sheet-stacked sample, and the average value for the five times of measurement is divided by 10 to calculate the thickness.

In the biaxially stretched polypropylene film according to the present embodiment, the tensile fracture stress at 23° C. in the first direction is preferably 155 MPa or more, more preferably 160 MPa or more. When the tensile fracture stress of the biaxially stretched polypropylene film is 155 MPa or more, the internal structure of the biaxially stretched polypropylene film is sufficiently firm, the dielectric breakdown voltage of the film is further improved, and the dielectric strength performance of the capacitor element can be further improved. The tensile fracture stress at 23° C. in the first direction is preferably 300 MPa or less, more preferably 280 MPa or less, still more preferably 250 MPa or less. When the tensile fracture stress of the biaxially stretched polypropylene film is 300 MPa or less, the film forming stability (difficulty of film tearing) of the biaxially stretched polypropylene film is superior. In the present description, the tensile fracture stress at 23° C. in the MD direction may be referred to as $\sigma_{b23}$.

In the biaxially stretched polypropylene film according to the present embodiment, the thermal shrinkage at 125° C. in the first direction is preferably 7.0% or less, more preferably 6.5% or less. When the thermal shrinkage at 125° C. in the first direction is 7.0% or less, it is possible to prevent the film from shrinking too much when being used as a capacitor element at a high temperature. As a result, it is possible to prevent the gap between films from changing and causing deformation of the capacitor element and to suppress a decrease in the dielectric strength performance of the capacitor element. The thermal shrinkage at 125° C. in the first direction is preferably 3.0% or more, more preferably 4.0% or more, still more preferably 5.0% or more.

In the present embodiment, the thermal shrinkage at 125° C. in the first direction can be controlled by stretching conditions and the like. For example, when the first direction is the MD direction, the MD thermal shrinkage tends to be greater as the MD stretching ratio is higher and the temperatures in the MD preheating/stretching/relaxation processes are lower. In the present description, the thermal shrinkage at 125° C. in the MD direction may be referred to as $S_{b125}$.

In the biaxially stretched polypropylene film according to the present embodiment, the thermal shrinkage at 135° C. in the first direction is preferably 9.0% or less, more preferably 8.5% or less, still more preferably 8.0% or less. When the thermal shrinkage at 135° C. in the first direction is 9.0% or less, it is possible to prevent the film from shrinking too much when being used as a capacitor element at a high temperature. As a result, it is possible to prevent the gap between films from changing and causing deformation of the capacitor element and to suppress a decrease in the dielectric strength performance of the capacitor element. The thermal shrinkage at 135° C. in the first direction is preferably 3.0% or more, more preferably 4.0% or more, still more preferably 5.0% or more.

In the present embodiment, the thermal shrinkage at 135° C. in the first direction can be controlled by stretching conditions and the like. For example, when the first direction is the MD direction, the MD thermal shrinkage tends to be greater as the MD stretching ratio is higher and the temperatures in the MD preheating/stretching/relaxation processes are lower. In the present description, the thermal shrinkage at 135° C. in the MD direction may be referred to as $S_{b135}$.

The difference between the $S_{b125}$ and the $S_{b135}$ (namely, $S_{b125}-S_{b135}$) is preferably −4.0% or more and 0% or less, more preferably −3.0% or more and −0.1% or less, still more preferably −2.5% or more and −0.5% or less, particularly preferably −2.2% or more and −1.0% or less. When the difference is in the preferred range, the variation in strength in the TD direction based on the temperature variation due to the oil for insulation margin formation and the temperature change caused when the biaxially stretched polypropylene film passes near the evaporation source cannot be sufficiently diminished.

In the biaxially stretched polypropylene film according to the present embodiment, the dimensional change rate at 125° C. in the first direction is preferably −2.2% or more, more preferably −2.0% or more. When the dimensional change rate at 125° C. in the first direction is −2.2% or more, it is possible to prevent the film from shrinking too much when being used as a capacitor element at a high temperature. As a result, it is possible to prevent the gap between films from changing and causing deformation of the capacitor element and to suppress a decrease in the dielectric strength performance of the capacitor element. The dimensional change rate at 125° C. in the first direction is preferably 1.0% or less, more preferably 0.5% or less, still more preferably 0.0% or less.

In the present embodiment, the dimensional change rate at 125° C. in the first direction can be controlled by stretching conditions and the like. For example, when the first direction is the MD direction, the MD dimensional change rate tends to be greater in the negative direction (that is, the MD dimensional change rate value tends to be lower) as the MD stretching ratio is higher. For example, when the first direction is the MD direction, the MD dimensional change rate tends to be greater in the negative direction (that is, the MD dimensional change rate value tends to be lower) as the temperature in the MD preheating/stretching/relaxation processes is lower.

The dimensional change rate at 125° C. in the first direction is a value measured by the TMA method and more specifically is measured by the method described in Examples. In the present description, the dimensional change rate at 125° C. in the first direction may be referred to as $D_{b125}$.

In the biaxially stretched polypropylene film according to the present embodiment, the dimensional change rate at 135° C. in the first direction is preferably −3.2% or more, more preferably −3.0% or more. When the dimensional change rate at 135° C. in the first direction is −3.2% or more, it is possible to prevent the film from shrinking too much when being used as a capacitor element at a high temperature. As a result, it is possible to prevent the gap between films from changing and causing deformation of the capacitor element and to suppress a decrease in the dielectric strength performance of the capacitor element. The dimensional change rate at 135° C. in the first direction is preferably 1.0% or less, more preferably 0.5% or less, still more preferably 0.0% or less.

In the present embodiment, the dimensional change rate at 135° C. in the first direction can be controlled by stretching conditions and the like. For example, when the first direction is the MD direction, the MD dimensional change rate tends to be greater in the negative direction as the MD stretching ratio is higher and the temperature in the MD preheating/stretching/relaxation processes is lower.

The dimensional change rate at 135° C. in the first direction is a value measured by the TMA method and more specifically is measured by the method described in Examples. In the present description, the dimensional change rate at 135° C. in the first direction may be referred to as $D_{b135}$.

The difference between the $D_{b125}$ and the $D_{b135}$ (namely, $D_{b125}-D_{b135}$) is preferably 0% or more and 1.5% or less, more preferably 0.1% or more and 1.0% or less, still more preferably 0.2% or more and 0.9% or less, particularly preferably 0.3% or more and 0.8% or less. When the difference is in the preferred range, the variation in strength in the TD direction based on the temperature variation due to the oil for insulation margin formation and the temperature change caused when the biaxially stretched polypropylene film passes near the evaporation source cannot be sufficiently diminished.

In the biaxially stretched polypropylene film according to the present embodiment, the crystallite size of the (040) face measured by the wide angle X-ray diffraction method is preferably 12.20 nm or less, more preferably 12.00 nm or less. As the crystallite size is smaller, the leakage current decreases, structure collapse due to Joule heat generation is less likely to occur, and the heat resistance, dielectric strength, and long-term heat resistance and dielectric strength are preferably improved. However, the lower limit of the crystallite size is usually considered to be 10.00 nm, preferably 11.00 nm from the viewpoint of mechanical strength and the like and in consideration of the lamellar (folded crystal) thickness of the polymer chain.

In the present embodiment, the crystallite size can be controlled by cooling conditions, stretching conditions and the like when the cast roll stock sheet is obtained. The crystallite size tends to be smaller as the cast temperature is lower, the stretching ratio is higher, and the stretching temperature is lower.

In the biaxially stretched polypropylene film according to the present embodiment, the time until the capacitance change rate reaches +5% or more or −5% or less is preferably 500 hours or more when a capacitor element is fabricated according to the method described in Examples and a temperature marginal test is performed.

In the biaxially stretched polypropylene film according to the present embodiment, the time until the capacitance change rate reaches +5% or more or −5% or less is preferably 500 hours or more when a capacitor element is fabricated according to the method described in Examples and a voltage marginal test is performed.

Next, suitable raw materials and production method of the biaxially stretched polypropylene film according to the present embodiment will be described below. However, the raw materials and production method of the biaxially stretched polypropylene film according to the present embodiment are not limited to the following descriptions, respectively.

The biaxially stretched polypropylene film contains a polypropylene resin. The content of the polypropylene resin is preferably 90% by mass or more, more preferably 95% by mass or more with respect to the entire biaxially stretched polypropylene film (when the entire biaxially stretched polypropylene film is 100% by mass). The upper limit of the content of the polypropylene resin is, for example, 100% by mass, 98% by mass and the like with respect to the entire biaxially stretched polypropylene film. The polypropylene resin may include one kind of polypropylene resin singly or two or more kinds of polypropylene resins.

Here, when two or more kinds of polypropylene resins are contained in the biaxially stretched polypropylene film, the polypropylene resin having the higher content is referred to as "polypropylene resin as a main component" in the present description. When one kind of polypropylene resin is contained in the biaxially stretched polypropylene film, the polypropylene resin is referred to as "polypropylene resin as a main component" in the present description.

Hereinafter, in the present description, when the term "polypropylene resin" is used without specifying whether or not it is a main component, it means both a polypropylene resin as a main component and a polypropylene resin other than the main component unless otherwise stated. For example, when it is stated that "the weight average molecular weight Mw of polypropylene resin is preferably 250,000 or more and 450,000 or less", it means both that the weight average molecular weight Mw of polypropylene resin as a main component is preferably 250,000 or more and 450,000 or less and that the weight average molecular weight Mw of polypropylene resin other than the main component is preferably 250,000 or more and 450,000 or less.

The weight average molecular weight Mw of polypropylene resin is preferably 250,000 or more and 450,000 or less, more preferably 250,000 or more and 400,000 or less. When the weight average molecular weight Mw of polypropylene resin is 250,000 or more and 450,000 or less, the resin fluidity is moderate. As a result, the thickness of the cast roll stock sheet is easily controlled and a thin stretched film is easily fabricated.

The molecular weight distribution (Mw/Mn) of polypropylene resin is preferably 5 or more and 12 or less, more preferably 5 or more and 11 or less, still more preferably 5 or more and 10 or less.

In the present description, the weight average molecular weight (Mw), the number average molecular weight (Mn), and the molecular weight distribution (Mw/Mn) of polypropylene resin are values measured using a gel permeation chromatograph (GPC). More specifically, these are values measured using HLC-8321GPC-HT (trade name) of a high temperature GPC measuring instrument with a built-in differential refractometer (RI) manufactured by Tosoh Corporation. As the GPC column, one TSKgel guardcolumn HHR(30)HT (7.5 mm I.D.×7.5 cm) and three TSKgel GMHHR-H(20)HT manufactured by Tosoh Corporation are connected and used. The column temperature is set to 140° C., trichlorobenzene as an eluent is allowed to flow at a flow velocity of 1.0 ml/10 minutes, and the calibration curve of a fifth-order approximation curve is created using standard polystyrene manufactured by Tosoh Corporation. However, the molecular weight is converted to the molecular weight of polypropylene using Q-factor. From the calibration curve acquired and SEC chromatogram, the weight average molecular weight (Mw) and the number average molecular weight (Mn) are acquired using the analysis software for the measuring instrument.

The differential distribution value difference $D_M$ of polypropylene resin is preferably −5% or more and 14% or less, more preferably −4% or more and 12% or less, still preferably −4% or more and 10% or less. Here, the "differential distribution value difference $D_M$" is the difference obtained by subtracting the differential distribution value when the logarithmic molecular weight Log (M)=6.0 from the differential distribution value when Log (M)=4.5 in the molecular weight differential distribution curve.

By the expression "differential distribution value difference $D_M$ is −5% or more and 14% or less", it can be understood that the amount of lower molecular weight component is larger when the difference is positive and the amount of higher molecular weight component is larger when the difference is negative when a component having a logarithmic molecular weight Log(M)=4.5 as a representative distribution value of a component having a molecular weight of 10,000 to 100,000 on the lower molecular weight side (hereinafter, also referred to as "lower molecular weight component") and a component around Log(M)=6.0 as a representative distribution value of a component having a molecular weight of around 1,000,000 on the higher molecular weight side (hereinafter, also referred to as "higher molecular weight component") are compared with each other from the values of Mw of polypropylene resin.

In other words, the molecular weight distribution Mw/Mn being 5 to 12 merely indicates the breadth of the molecular weight distribution width, and the quantitative relation between the higher molecular weight component and the lower molecular weight component therein is not recognized. From the viewpoint of stable film formability and thickness uniformity of cast roll stock sheet, it is preferred to use a polypropylene resin so that the differential distribution value difference is −5% or more and 14% or less when a component having a molecular weight of 10,000 to 100,000 is compared with a component having a molecular weight of 1,000,000 in order that the polypropylene resin has a wide molecular weight distribution and, at the same time, moderately contains a lower molecular weight component.

The differential distribution value difference $D_M$ is a value obtained as follows. First, a SEC chromatogram is acquired in the same manner as above. The analysis software built in the measuring instrument used is used to convert this chromatogram into a differential molecular weight distribution curve. From this differential molecular weight distribution curve, the differential molecular weight distribution values when Log (M)=4.5 and Log (M)=6.0 are read. The differential distribution value difference $D_M$ is calculated by subtracting the differential molecular weight distribution value when Log (M)=6.0 from the differential molecular weight distribution value when Log (M)=4.5.

The heptane insoluble (HI) content in the polypropylene resin is preferably 96.0% or more, more preferably 97.0% or more. The heptane insoluble (HI) content in the polypropylene resin is preferably 99.5% or less, more preferably 99.0% or less. Here, it indicates that the stereoregularity of the resin is higher as the amount of heptane insolubles is larger. When the heptane insoluble (HI) content is 96.0% or more and 99.5% or less, the crystallinity of the resin is moderately improved by the moderately high stereoregularity, and the dielectric strength at a high temperature is improved. Meanwhile, the speed of the solidification (crystallization) at the time of cast roll stock sheet formation is moderate and moderate stretchability is attained.

The mesopentad fraction ([mmmm]) in the polypropylene resin is preferably 94.0% or more, more preferably 94.5% or more, still more preferably 95.0% or more. The mesopentad fraction in the polypropylene resin is preferably less than 98.0%, more preferably 97.5% or less, still more preferably 97.0% or less. By using such a polypropylene resin, the crystallinity of the resin is moderately improved by the moderately high stereoregularity and the initial dielectric strength and the long-term dielectric strength are improved. Meanwhile, it is possible to obtain desired stretchability by a moderate solidification (crystallization) speed at the time of cast roll stock sheet formation.

The mesopentad fraction ([mmmm]) is an index for stereoregularity that can be obtained by high temperature nuclear magnetic resonance (NMR) measurement. In the present description, the mesopentad fraction ([mmmm]) refers to a value measured utilizing a high temperature type Fourier transformation nuclear magnetic resonance apparatus (high temperature FT-NMR) JNM-ECP500 manufactured by JEOL Ltd. The observation nuclear is 13C (125 MHz), measurement temperature is 135° C., and orthodichlorobenzene (ODCB:mixed solvent (mixing ratio=4/1) of ODCB and deuterated ODCB) is used as a solvent for dissolving polypropylene resin. The measuring method by high temperature NMR can be performed, for example, by referring to the method described in "Kobunshi Bunseki Handbook, New edition, The Japan Society for Analytical chemistry ed., KINOKUNIYA COMPANY LTD, 1995, p. 610".

The melt flow rate (MFR) of the polypropylene resin is preferably 1.0 to 8.0 g/10 min, more preferably 1.5 to 7.0 g/10 min, still more preferably 2.0 to 6.0 g/10 min.

The polypropylene resin can be produced by a generally known polymerization method. Examples of the polymerization method include gas-phase polymerization, block polymerization, and slurry polymerization. On the other hand, it is of course possible to use a commercially available product as the polypropylene resin.

It is preferred that the total ash originating in the polymerization catalyst residue or the like contained in the polypropylene raw material resin is as small as possible in order to improve the electric characteristics. The total ash is preferably 50 ppm or less, more preferably 40 ppm or less, particularly preferably 30 ppm or less on the basis of the polypropylene resin (100 parts by weight).

The polypropylene resin or polypropylene resin composition may contain additives. Examples of the additives include an antioxidant, a chlorine absorber, an ultraviolet ray absorber, a lubricant, a plasticizer, a flame retarder, an antistatic agent, and a nucleating agent (for example, a molten nucleating agent). The polypropylene resin or polypropylene resin composition may contain additives in an amount that does not adversely affect the biaxially stretched polypropylene film. It is preferred that the molten nucleating agent is not substantially contained in the polypropylene resin or the polypropylene resin composition.

From here, each polypropylene resin when two or more kinds of polypropylene resins are used will be described for a while.

When two or more kinds of polypropylene resins are used, examples of suitable combination thereof include combination of the following linear polypropylene resin A-1 with the following linear polypropylene resin B-1, the following linear polypropylene resin A-2 with the following linear polypropylene resin B-2, the following linear polypropylene resin A-3 with the following linear polypropylene resin B-3, or the following linear polypropylene resin A-4 with the following linear polypropylene resin B-4. In the present embodiment, the expression linear polypropylene resin A includes the concepts of linear polypropylene resin A-1, linear polypropylene resin A-2, linear polypropylene resin A-3, and linear polypropylene resin A-4. The expression linear polypropylene resin B includes the concepts of linear polypropylene resin B-1, linear polypropylene resin B-2, linear polypropylene resin B-3, and linear polypropylene resin B-4.

<Linear Polypropylene Resin A>
(Linear Polypropylene Resin A-1)
A linear polypropylene resin having a differential distribution value difference $D_M$ of 8.0% or more.
(Linear Polypropylene Resin A-2)
A linear polypropylene resin having a heptane insoluble (HI) content of 98.5% or less.
(Linear Polypropylene Resin A-3)
A linear polypropylene resin having a melt flow rate (MFR) of 4.0 g/10 min or more and 10.0 g/10 min or less at 230° C.
(Linear Polypropylene Resin A-4)
A linear polypropylene resin having a weight average molecular weight (Mw) of 250,000 or more and less than 345,000.
<Linear Polypropylene Resin B>
(Linear Polypropylene Resin B-1)
A linear polypropylene resin having a differential distribution value difference $D_M$ of less than 8.0%.
(Linear Polypropylene Resin B-2)
A linear polypropylene resin having a heptane insoluble (HI) content of more than 98.5%.
(Linear Polypropylene Resin B-3)
A linear polypropylene resin having a melt flow rate (MFR) of 0.1 g/10 min or more and less than 4.0 g/10 min at 230° C.
(Linear Polypropylene Resin B-4)
A linear polypropylene resin having a weight average molecular weight (Mw) of 345,000 or more and 450,000 or less.

In the present embodiment, the linear polypropylene resin A may be the polypropylene resin as a main component or the linear polypropylene resin B may be the polypropylene resin as a main component, but the linear polypropylene resin A is preferably the polypropylene resin as a main component.

The weight average molecular weight Mw of the linear polypropylene resin A is preferably 250,000 or more and 450,000 or less, more preferably 250,000 or more and 400,000 or less, still more preferably 250,000 or more and less than 345,000. When the weight average molecular weight Mw of the linear polypropylene resin A is 250,000 or more and 450,000 or less, the resin fluidity is moderate. As a result, the thickness of the cast roll stock sheet is easily controlled and a thin biaxially stretched polypropylene film is easily fabricated. It is preferred since unevenness in the thickness of the cast roll stock sheet and biaxially stretched polypropylene film is less likely to be generated and moderate stretchability is attained.

The molecular weight distribution Mw/Mn of the linear polypropylene resin A is preferably 8.5 or more and 12.0 or less, more preferably 8.5 or more and 11.0 or less, still more preferably 9.0 or more and 11.0 or less.

It is preferred that the molecular weight distribution Mw/Mn of the linear polypropylene resin A is within the preferred range since unevenness in the thickness of the cast roll stock sheet and biaxially stretched polypropylene film is less likely to be generated and moderate stretchability is attained.

The differential distribution value difference $D_M$ of the linear polypropylene resin A is preferably 8.0% or more, more preferably 8.0% or more and 18.0% or less, still more preferably 9.0% or more and 17.0% or less, particularly preferably 10.0% or more and 16.0% or less.

The linear polypropylene resin A contains a lower molecular weight component in a larger amount than a higher molecular weight component by a proportion of 8.0% or more and 18.0% or less when the differential distribution value difference $D_M$ is 8.0% or more and 18.0% or less. Hence, it is preferred since the surface of the biaxially stretched polypropylene film in the present embodiment is likely to be obtained.

The heptane insoluble (HI) content in the linear polypropylene resin A is preferably 96.0% or more, more preferably 97.0% or more. The heptane insoluble (HI) content in the linear polypropylene resin A is preferably 99.5% or less, more preferably 98.5% or less, still more preferably 98.0% or less.

The melt flow rate (MFR) of the linear polypropylene resin A at 230° C. is preferably 1.0 to 15.0 g/10 min, more preferably 2.0 to 10.0 g/10 min, still more preferably 4.0 to 10.0 g/10 min, particularly preferably 4.3 to 6.0 g/10 min. When the MFR of the polypropylene A at 230° C. is within the range, the flow characteristics in the molten state are excellent, thus unstable flow such as melt fracture hardly occurs, and breakdown at the time of stretching is suppressed. Hence, the film thickness uniformity is favorable, and thus there is an advantage that the formation of thin portion at which dielectric breakdown easily occurs is suppressed.

The content of the linear polypropylene resin A is preferably 55% by mass or more and 90% by mass or less, more preferably 60% by mass or more and 85% by mass or less, still more preferably 60% by mass or more and 80% by mass or less with respect to the entire biaxially stretched polypropylene film.

The weight average molecular weight Mw of the linear polypropylene resin B is preferably 300,000 or more and 400,000 or less, more preferably 330,000 or more and 380,000 or less, still more preferably 350,000 or more and 380,000 or less. The weight average molecular weight Mw of the linear polypropylene resin B is also preferably 345,000 or more and 450,000 or less.

The molecular weight distribution Mw/Mn of the linear polypropylene resin B is preferably 6.0 or more and less than 8.5, more preferably 6.5 or more and 8.4 or less, still more preferably 7.0 or more and 8.3 or less.

It is preferred that the molecular weight distribution Mw/Mn of the linear polypropylene resin B is within the preferred range since unevenness in the thickness of the cast roll stock sheet and biaxially stretched polypropylene film is less likely to be generated and moderate stretchability is attained.

The differential distribution value difference $D_M$ of the linear polypropylene resin B is preferably less than 8.0%, more preferably −20.0% or more and less than 8.0%, still more preferably −10.0% or more and 7.9% or less, particularly preferably −5.0% or more and 7.5% or less.

The heptane insoluble (HI) content in the linear polypropylene resin B is preferably 97.5% or more, more preferably 98% or more, still more preferably more than 98.5% or more, particularly preferably 98.6% or more. The heptane insoluble (HI) content in the linear polypropylene resin B is preferably 99.5% or less, more preferably 99.0% or less.

The melt flow rate (MFR) of the linear polypropylene resin B at 230° C. is preferably 0.1 to 6.0 g/10 min or less, more preferably 0.1 to 5.0 g/10 min or less, still more preferably less than 0.1 to 4.0 g/10 min, particularly preferably 0.1 to 3.9 g/10 min or less.

When the linear polypropylene resin B is used as a polypropylene resin, the content of the linear polypropylene resin B is preferably 10% by mass or more and 45% by mass or less, more preferably 15% by mass or more and 40% by mass or less, still more preferably 20% by mass or more and 40% by mass or less when the polypropylene resins is 100% by mass.

When the linear polypropylene resin A and the linear polypropylene resin B are used in combination as the polypropylene resin, it is preferred to contain the linear polypropylene resin A at 55% to 90% by weight and the linear polypropylene resin B at 45% to 10% by weight, it is more preferred to contain the linear polypropylene resin A at 60% to 85% by weight and the linear polypropylene resin B at 40% to 15% by weight, it is particularly preferred to contain the linear polypropylene resin A at 60% to 80% by weight and the linear polypropylene resin B at 40% to 20% by weight when the total polypropylene resins is 100% by mass.

When the polypropylene resin contains the linear polypropylene resin A and the linear polypropylene resin B, the biaxially stretched polypropylene film is in a finely mixed state (phase separated state) of the linear polypropylene resin A and the linear polypropylene resin B, and thus the dielectric strength at a high temperature is improved.

Each polypropylene resin when two or more kinds of polypropylene resins are used has been described above.

The biaxially stretched polypropylene film may contain resins other than the polypropylene resin (hereinafter, also referred to as "other resins"). Examples of the other resins include polyolefins other than polypropylene such as polyethylene, poly(1-butene), polyisobutene, poly(1-pentene), and poly(1-methylpentene); copolymers of α-olefins such as ethylene-propylene copolymer, propylene-butene copolymer, and ethylene-butene copolymer; vinyl monomer-diene monomer random copolymers such as styrene-butadiene random copolymer; and vinyl monomer-diene monomer-vinyl monomer random copolymers such as styrene-butadiene-styrene block copolymer. The biaxially stretched polypropylene film may contain such other resins in an amount in the range that does not adversely affect the biaxially stretched polypropylene film. It is preferred that the biaxially stretched polypropylene film does not substantially contain these other resins.

The cast roll stock sheet before stretching for producing the biaxially stretched polypropylene film can be suitably fabricated as follows. However, the method for producing the biaxially stretched polypropylene film of the present disclosure is not limited to the methods described below.

First, the polypropylene resin composition (for example, polypropylene resin pellets, dry-mixed polypropylene resin pellets, or mixed polypropylene resin pellets prepared in advance by melt-kneading) is supplied to an extruder and melted under heating.

The setting temperature of the extruder at the time of heat melting is preferably 220° C. to 280° C., more preferably 230° C. to 270° C. The resin temperature at the time of heat melting is preferably 220° C. to 280° C., more preferably 230° C. to 270° C. The resin temperature at the time of heat melting is a value measured using a thermometer inserted in the extruder.

The setting temperature of the extruder and the resin temperature at the time of heat melting are selected in consideration of the physical properties of the polypropylene resin used. By setting the resin temperature at the time of heat melting within such a numerical range, it is also possible to suppress deterioration of the resin.

Next, the molten resin composition is extruded into a sheet using a T-die, and cooled and solidified using at least one or more metal drums to form an unstretched cast roll stock sheet.

The surface temperature of the metal drum (the temperature of the metal drum that first comes into contact with the molten resin composition after extrusion) is preferably 50° C. to 100° C., more preferably 90° C. to 100° C. The surface temperature of the metal drum can be determined depending on the physical properties and the like of the polypropylene resin used. When the surface temperature of the metal drum is too high or too low with respect to the preferred range, the degree of surface roughness of the polypropylene film may be affected, and thus the healing property (safety) and dielectric strength of the capacitor element may decrease.

The biaxially stretched polypropylene film can be produced by subjecting the cast roll stock sheet to a biaxial stretching treatment. A sequential biaxial stretching method is preferred as the biaxial stretching method.

In the sequential biaxial stretching method, for example, the cast roll stock sheet can be preheated using the MD preheating roll group located upstream the MD stretching roll group, the preheated cast roll stock sheet can be then stretched in the MD direction using the MD stretching roll group, the sheet stretched in the MD direction can be then relaxed using the MD relaxation roll group located downstream the MD stretching roll group, and the sheet can be stretched in the TD direction using the tenter. Hereinafter, stretching in the MD direction may be referred to as MD stretching or vertical stretching, and stretching in the TD direction may be referred to as TD stretching or horizontal stretching.

The temperature of the most upstream preheating roll, namely, the first stage preheating roll in the MD preheating roll group is preferably lower than the temperatures of the second and subsequent stage preheating rolls, for example, preferably 60° C. to 95° C., more preferably 75° C. to 95° C. When the temperature of the first stage preheating roll is too high or too low with respect to the preferred range, the air may be locally caught between the cast roll stock sheet and the first stage preheating roll, and this may affect the flatness of the sheet.

The temperatures of the second and subsequent stage preheating rolls are preferably 115° C. to 138° C., more preferably 120° C. to 138° C. As the temperatures of the second and subsequent stage preheating rolls are higher, the tensile fracture stress difference ($\sigma_{b125}-\sigma_{b135}$) tends to be smaller. When the temperatures of the second and subsequent stage preheating rolls are too high, it is difficult to adjust the tensile fracture stress at 135° C. to 70 MPa or more and the tensile fracture stress difference ($\sigma_{b125}-\sigma_{b135}$) to 0 MPa or more and 15 MPa or less. When the temperatures of the second and subsequent stage preheating rolls are too low, it is difficult to adjust the tensile fracture stress difference ($\sigma_{b125}-\sigma_{b135}$) to 0 MPa or more and 15 MPa or less.

The close contact time with the MD preheating roll group is preferably 5 to 10 seconds. As the close contact time is longer, the tensile fracture stress difference ($\sigma_{b125}-\sigma_{b135}$) tends to be smaller. When the close contact time is too long, it is difficult to adjust the tensile fracture stress at 135° C. to 70 MPa or more and the tensile fracture stress difference ($\sigma_{b125}-\sigma_{b135}$) to 0 MPa or more and 15 MPa or less. When the close contact time is too short, it is difficult to adjust the tensile fracture stress difference ($\sigma_{b125}-\sigma_{b135}$) to 0 MPa or more and 15 MPa or less. The close contact time with the MD preheating roll group refers to the length of time during which an arbitrary place of the cast roll stock sheet is actually in close contact with the MD preheating rolls constituting the MD preheating roll group and does not include the time during which the place is not in close contact with any MD preheating roll between adjacent MD preheating rolls.

The temperature of the MD stretching roll group is preferably 130° C. to 150° C. As the temperatures of the MD stretching roll group is higher, the tensile fracture stress difference ($\sigma_{b125}-\sigma_{b135}$) tends to be smaller. When the temperatures of the MD stretching roll group is too high, it is difficult to adjust the tensile fracture stress at 135° C. to 70 MPa or more and the tensile fracture stress difference ($\sigma_{b125}-\sigma_{b135}$) to 0 MPa or more and 15 MPa or less. When the temperatures of the MD stretching roll group is too low, it is difficult to adjust the tensile fracture stress difference ($\sigma_{b125}-\sigma_{b135}$) to 0 MPa or more and 15 MPa or less.

The close contact time with the MD stretching roll group is preferably 1 to 2 seconds. As the close contact time is longer, the tensile fracture stress difference ($\sigma_{b125}-\sigma_{b135}$) tends to be smaller. When the close contact time is too long, it is difficult to adjust the tensile fracture stress at 135° C. to 70 MPa or more and the tensile fracture stress difference ($\sigma_{b125}-\sigma_{b135}$) to 0 MPa or more and 15 MPa or less. When the close contact time is too short, it is difficult to adjust the tensile fracture stress difference ($\sigma_{b125}-\sigma_{b135}$) to 0 MPa or more and 15 MPa or less. The close contact time with the MD stretching roll group refers to the length of time during which an arbitrary place of the cast roll stock sheet is actually in close contact with the MD stretching rolls constituting the MD stretching roll group and does not include the time during which the place is not in close contact with any MD stretching roll between adjacent MD stretching rolls.

The MD stretching ratio is preferably 4.5 to 6.0 times. As the MD stretching ratio is higher, the tensile fracture stress ($\sigma_{b135}$) at 135° C. tends to be higher and the tensile fracture stress difference ($\sigma_{b125}-\sigma_{b135}$) tends to be greater. When the MD stretching ratio is too high, the orientation of the polypropylene film after being MD stretched is too high and stretching breakdown may occur in the TD stretching process. When the MD stretching ratio is too low, it is difficult to adjust the tensile fracture stress at 135° C. to 70 MPa or more.

The temperature of the MD relaxation roll group is preferably 120° C. to 128° C. As the temperatures of the MD relaxation roll group is higher, the tensile fracture stress difference ($\sigma_{b125}-\sigma_{b135}$) tends to be smaller. When the temperature of the MD relaxation roll group is too high, it is difficult to adjust the tensile fracture stress at 135° C. in the first direction to 70 MPa or more. When the temperature of the MD relaxation roll group is too low, the thermal shrinkage and dimensional change rate at a high temperature in the first direction increase, the gap between films changes, deformation of the capacitor element is caused, and the dielectric strength performance of the capacitor element decreases in some cases.

The close contact time with the MD relaxation roll group is preferably 1 to 2 seconds. As the close contact time is longer, the tensile fracture stress difference ($\sigma_{b125}-\sigma_{b135}$) tends to be smaller. When the close contact time is too short, it is difficult to adjust the tensile fracture stress difference ($\sigma_{b125}-\sigma_{b135}$) to 0 MPa or more and 15 MPa or less. When the close contact time is too long, it is difficult to adjust the tensile fracture stress at 135° C. to 70 MPa or more. The close contact time with the MD relaxation roll group refers to the length of time during which an arbitrary place of the cast roll stock sheet is actually in close contact with the MD relaxation rolls constituting the MD relaxation roll group and does not include the time during which the place is not in close contact with any MD relaxation roll between adjacent MD relaxation rolls.

It is preferred that the polypropylene film after being MD stretched by passing through the MD relaxation roll group is led to a tenter and TD stretched 3 to 11 times at 155° C. to 170° C.

The polypropylene film after being TD stretched is relaxed and heat-fixed. In this manner, a biaxially stretched polypropylene film is obtained.

The biaxially stretched polypropylene film may be subjected to corona discharge treatment online or offline after the stretching and heat fixing processes are completed for the purpose of improving the adhesive properties in the post processes such as the deposition process. The corona discharge treatment can be performed by a known method. It is preferred to use air, carbon dioxide gas, nitrogen gas, or a mixed gas of these as an atmospheric gas.

An oil with a pattern corresponding to the pattern of the insulation margin is applied to one surface of the biaxially stretched polypropylene film to form an oil mask for insulation margin, this is subjected to metal deposition to obtain a metallized film before slit. The oil mask for insulation margin is for preventing metal particles from adhering to the part to be the insulation margin of the biaxially stretched polypropylene film by metal deposition. The oil mask for insulation margin can be formed by vaporizing the oil for insulation margin formation which is stored in the oil tank and spraying the oil onto the biaxially stretched polypropylene film through the nozzle provided to the tank. The oil is blown toward the biaxially stretched polypropylene film at 100° C. to 150° C. The biaxially stretched polypropylene film after formation of the oil mask for insulation margin is allowed to pass through between the evaporation source and the cooling roll to form a metal layer. In the evaporation source, the metal for metal deposition is usually heated to 600° C. or more and evaporated. The metal vapor is released toward the surface on which the oil mask for insulation margin is formed between the two surfaces of the biaxially stretched polypropylene film after formation of the oil mask for insulation margin. The cooling roll can usually be maintained at −30° C. to −20° C. Examples of the metal used in metal deposition include simple metals such as zinc, lead, silver, chromium, aluminum, copper, and nickel, mixtures composed of a plurality of these, and alloys of these. When the active portion of the metal layer is provided with a margin pattern, the oil mask for pattern can be formed on the surface on which the oil mask for insulation margin is formed between the two surfaces of the biaxially stretched polypropylene film between the formation of the oil mask for insulation margin and the metal deposition, that is, after the formation of the oil mask for insulation margin and before the metal deposition. The oil mask for pattern is usually formed using a plate roll. The temperature of the oil for forming the oil mask for pattern is lower than that for forming the oil mask for insulation margin. The oil for forming the oil mask for pattern is applied to the biaxially stretched polypropylene film at, for example, room temperature (40° C. or less as an example).

The metallized film before slit thus obtained and the metallized film obtained by dividing the metallized film before slit will be described from here with reference to the drawings.

Figure 3:
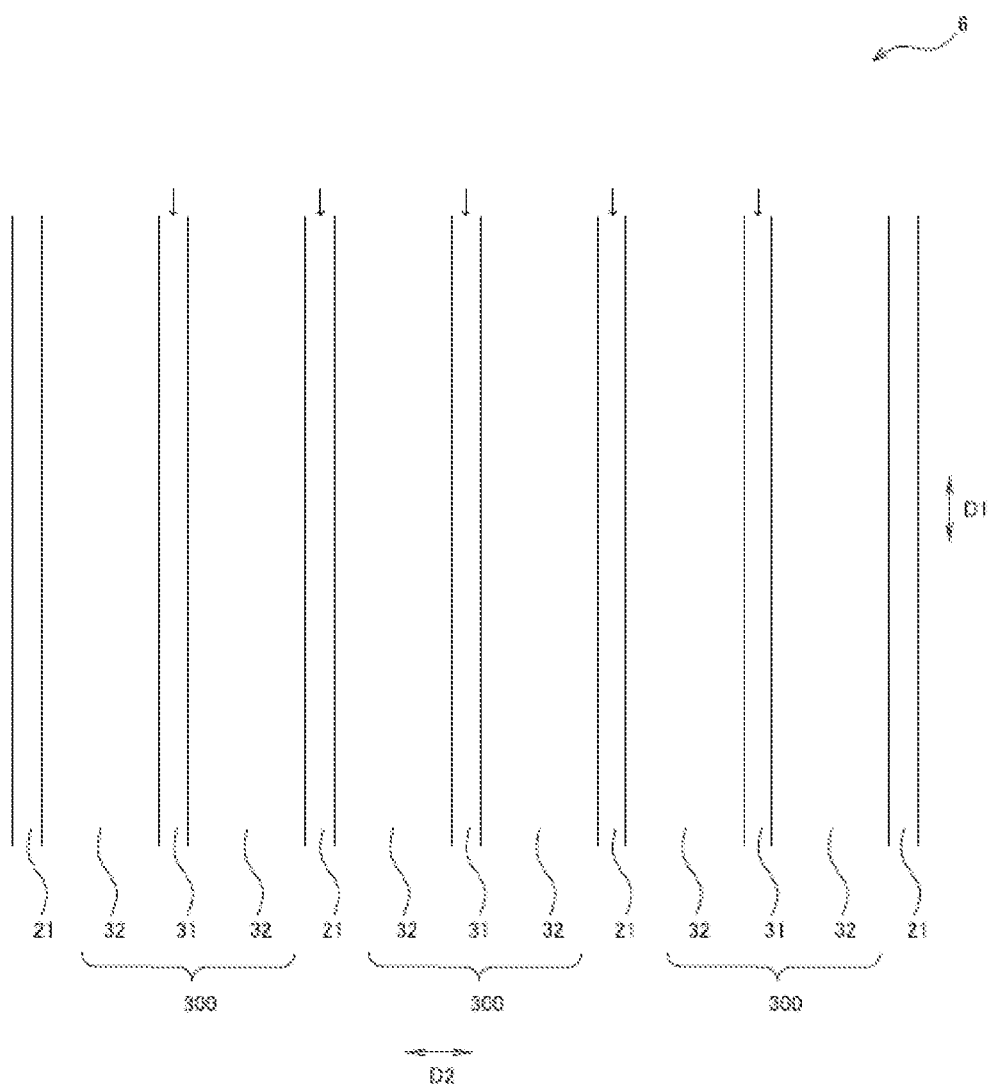
FIG. 3 is a schematic plan view of a metallized film before slit which has been unwound from a take-up roll.

As illustrated in FIG. 3, a metallized film before slit 6 includes a plurality of insulation margins 21 that continuously extend in a MD direction D1 and a metal layer 300 that continuously extends in the MD direction D1. In the metallized film before slit 6, the insulation margin 21 and the metal layer 300 are alternately arranged in a TD direction D2. Each metal layer 300 includes two active portions 32 and a heavy edge portion 31 located between the active portions 32. In other words, in each metal layer 300, the first active portion 32, the heavy edge portion 31, and the second active portion 32 are arranged in this order in the TD direction D2. In this manner, the first active portion 32 extends in the TD direction D2 from one end of the heavy edge portion 31 in the TD direction D2 and the second active portion 32 extends in the TD direction D2 from the other end of the heavy edge portion 31 in the TD direction D2. The first and second active portions 32 continuously extend in the MD direction D1. The heavy edge portion 31 also continuously extends in the MD direction D1. In the example illustrated in FIG. 3, the insulation margins 21 are provided at both ends of the metallized film before slit 6 in the TD direction D2, but the metal layer 300 may be provided at these both ends or one of these both ends. A margin pattern may be formed (not illustrated) on the first and second active portions 32.

In the slitting process of the metallized film before slit 6, cutting blades are inserted at the center (hereafter, referred to as "TD direction center" in some cases) of each insulation margin 21 in the TD direction D2 and at the center of each heavy edge portion 31 in the TD direction, the metallized film before slit 6 is divided into a plurality of sheets in the TD direction D2, and a metallized film 5 (see FIGS. 1 and 2) is wound around the core. An example of the position and cutting direction of the cutting blade is indicated by a bar-shaped arrow in FIG. 3. The metallized film may be stored in the form of a metallized film roll that is rolled into a roll. The metallized film roll (also simply referred to as film roll) may or may not have a winding core (core). The metallized film roll preferably has a winding core (core). The winding core is preferably cylindrical. The material for the winding core of the metallized film roll is not particularly limited. Examples of the material include paper (paper tube), resin, fiber reinforced plastic (FRP), and metal. Examples of the resin include polyvinyl chloride, polyethylene, polypropylene, phenol resin, epoxy resin, and acrylonitrile-butadiene-styrene copolymer. Examples of the plastic constituting the fiber reinforced plastic include polyester resin, epoxy resin, vinyl ester resin, phenol resin, and thermoplastic resin. Examples of the fiber constituting the fiber reinforced plastic include glass fiber, aramid fiber (Kevlar (registered trademark) fiber), carbon fiber, polyparaphenylene benzoxazole fiber (Zylon (registered trademark) fiber), polyethylene fiber, and boron fiber. Examples of the metal include iron, aluminum, and stainless steel. The winding core of the metallized film roll also includes a winding core formed by impregnating a paper tube with the resin. In this case, the material for the winding core is classified as resin.

Figure 2:
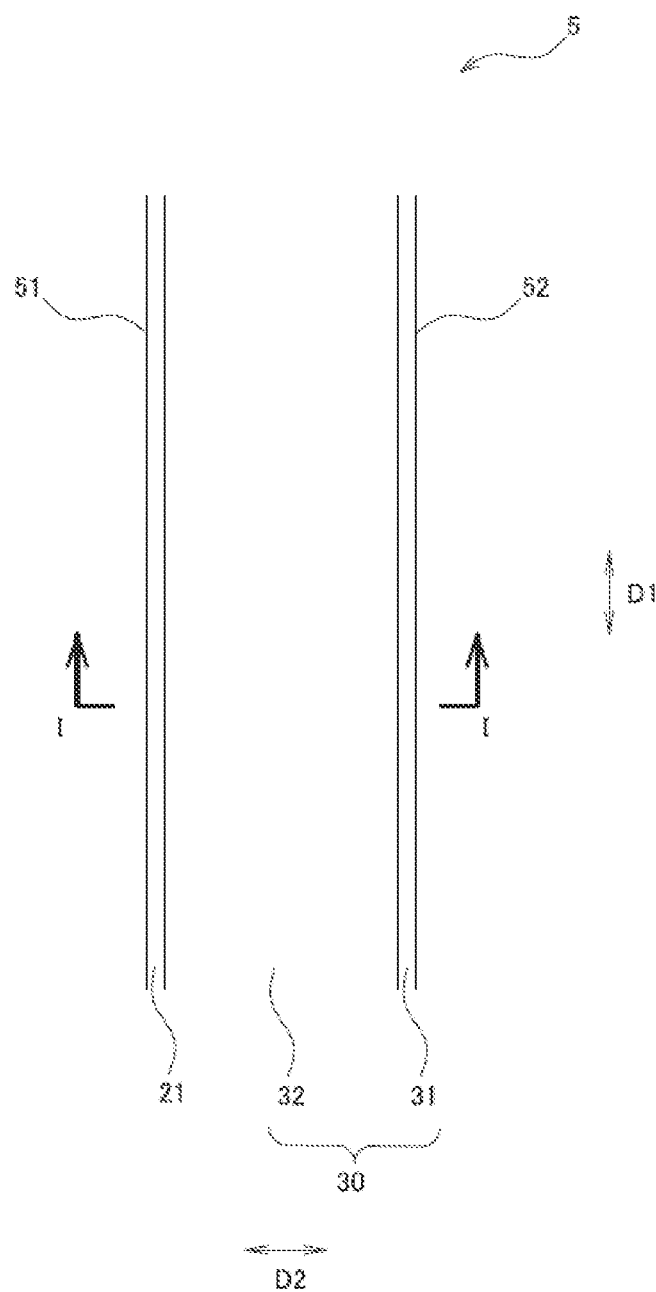
FIG. 2 is a schematic plan view of a metallized film.

As illustrated in FIGS. 1 and 2, the metallized film 5 thus obtained includes a biaxially stretched polypropylene film 10 and a metal layer 30 provided on one surface of the biaxially stretched polypropylene film 10. The thickness of the metal layer 30 is preferably within 1 nm to 200 nm.

In the metallized film 5, an insulation margin 21 that continuously extends in a MD direction D1 is provided at one end portion 51 in a TD direction D2. The length of the insulation margin 21 is larger than the width of the insulation margin 21.

The metal layer 30 is located next to the insulation margin 21 in the TD direction D2. The metal layer 30 extends from the other end portion 52 in the TD direction D2 to the insulation margin 21. Although not illustrated, the metal layer 30 continuously extends between both ends of the metallized film 5 in the MD direction D1. In other words, the metal layer 30 continuously extends from one end portion of the metallized film 5 in the MD direction D1 to the other end portion of the metallized film 5 in the MD direction D1. The width of the metal layer 30 is wider than the width of the insulation margin 21. For example, the width of the metal layer 30 is preferably 1.5 to 300 times the width of the insulation margin 21. Here, the width of the metal layer 30 refers to a value measured ignoring the margin pattern.

The metal layer 30 of the metallized film 5 includes a heavy edge portion 31. The heavy edge portion 31 is located at the end portion 52 of the metallized film 5 in the TD direction D2. The heavy edge portion 31 continuously extends in the MD direction D1. More specifically, the heavy edge portion 31 continuously extends between both ends of the metallized film 5 in the MD direction D1. In other words, the heavy edge portion 31 continuously extends from one end portion of the metallized film 5 in the MD direction D1 to the other end portion of the metallized film 5 in the MD direction D1. The thickness of the heavy edge portion 31 is thicker than the thickness of the active portion 32.

The metal layer 30 of the metallized film 5 includes an active portion 32. The active portion 32 continuously extends in the MD direction D1. More specifically, the active portion 32 continuously extends between both ends of the metallized film 5 in the MD direction D1. In other words, the active portion 32 continuously extends from one end portion of the metallized film 5 in the MD direction D1 to the other end portion of the metallized film 5 in the MD direction D1. A margin pattern, for example, a T margin pattern may be formed on the active portion 32. The film resistance of the metal layer 30 is usually about 1Ω/□ to 8Ω/□, preferably about 1Ω/□ to 5Ω/□.

The metallized film 5 can be laminated or wound by a conventionally known method to form a film capacitor. For example, one pair composed of two metallized films 5 is stacked and wound so that the metal layer 30 of the metallized film 5 and the biaxially stretched polypropylene film 10 are alternately laminated and the insulation margin 21 is on the opposite side. At this time, it is preferred that one pair composed of two metallized films 5 is laminated with a shift of 1 mm to 2 mm in the TD direction D2. The winding machine used is not particularly limited, and for example, an automatic winding machine Model 3KAW-N2 manufactured by KAIDO MFG. CO., LTD. can be utilized. When a flat capacitor is fabricated, the obtained wound product is usually pressed after winding. Winding and tightening of film capacitor and molding of capacitor element are promoted by pressing. From the viewpoint of controlling and stabilizing the interlayer gap, the optimum value of the applied pressure varies depending on the thickness of the biaxially stretched polypropylene film 10 but is, for example, 2 kg/cm$^2$ to 20 kg/cm$^2$. Subsequently to pressing, metal is sprayed onto both end faces of the wound product to provide a metallikon electrode, and a film capacitor is thus obtained.

As described above, the film capacitor may have a configuration in which a plurality of metallized films 5 are laminated or may include the metallized film 5 which is wound. Such a film capacitor can be suitably used as a capacitor for inverter power supply equipment that controls the drive motor of an electric vehicle, a hybrid vehicle, and the like. Such a film capacitor can also be suitably used for railway vehicles, wind power generation, solar power generation, general household appliances, and the like.

In FIGS. 1 and 2, the metallized film 5 in which the metal layer 30 is provided on one surface of the biaxially stretched polypropylene film 10 has been described, but it goes without saying that the metallized film of the present invention is not limited to the metallized film 5 having such a structure. For example, in the metallized film of the present invention, a metal layer may be provided on both surfaces of a biaxially stretched polypropylene film.

In the present embodiment, the metallized film having a heavy edge portion has been described, but it goes without saying that the metallized film may not have a heavy edge portion.

EXAMPLES

Next, the present invention will be described more specifically by Examples, but these examples are for explaining the present invention and do not limit the present invention in any way. Unless otherwise stated, "parts" and "%" in examples indicate "parts by mass" and "% by mass", respectively.

<PP Resin>

PP resin A used to fabricate the biaxially stretched polypropylene film of each example is a product manufactured by Prime Polymer Co., Ltd., and PP resin B is a product manufactured by KOREA PETROCHEMICAL IND CO., LTD. PP resin A and PP resin B are linear homopolypropylenes.

<Measurement of Weight Average Molecular Weight (Mw), Number Average Molecular Weight (Mn), and Molecular Weight Distribution (Mw/Mn)>

The weight average molecular weight (Mw), number average molecular weight (Mn), molecular weight distribution (Mw/Mn) of PP resin were measured by gel permeation chromatography (GPC) under the following conditions.

Specifically, Model HLC-8321GPC-HT of a high temperature GPC measuring instrument with a built-in differential refractometer (RI) manufactured by Tosoh Corporation was used. As the column, one TSKgel guardcolumn HHR(30)HT (7.5 mm I.D.×7.5 cm) and three TSKgel GMHHR-H(20)HT manufactured by Tosoh Corporation were connected and used. The measurement was performed at a column temperature to 140° C. by allowing trichlorobenzene as an eluent to flow at a flow velocity of 1.0 ml/min. A calibration curve of a fifth-order approximation curve was created using standard polystyrene manufactured by Tosoh Corporation. However, the molecular weight was converted to the molecular weight of polypropylene using Q-factor. From the calibration curve acquired and SEC chromatogram, the weight average molecular weight (Mw) and the number average molecular weight (Mn) were acquired using the analysis software for the measuring instrument.

<Measurement of Differential Distribution Value Difference $D_M$>

The differential distribution value difference $D_M$ was acquired by the following method. First, a SEC chromatogram was acquired in the same manner as above. The analysis software built in the measuring instrument used was used to convert this chromatogram into a differential molecular weight distribution curve. From this differential molecular weight distribution curve, the differential molecular weight distribution values when Log (M)=4.5 and Log (M)=6.0 were read. The differential distribution value difference $D_M$ was calculated by subtracting the differential molecular weight distribution value when Log (M)=6.0 from the differential molecular weight distribution value when Log (M)=4.5.

<Measurement of Mesopentad Fraction ([Mmmm])>

PP resin was dissolved in a solvent and subjected to the measurement under the following conditions using a high temperature type Fourier transformation nuclear magnetic resonance apparatus (high temperature FT-NMR).

High temperature type nuclear magnetic resonance (NMR) apparatus: high temperature type Fourier transformation nuclear magnetic resonance apparatus (high temperature FT-NMR), JNM-ECP500 manufactured by JEOL Ltd.

Observation nuclear: $^{13}C$ (125 MHz)
Measurement temperature: 135° C.
Solvent: ortho-dichlorobenzene (ODCB:mixed solvent (mixing ratio=4/1) of ODCB and deuterated ODCB)
Measurement mode: single pulse proton broadband decoupling
Pulse width: 9.1 μsec (450 pulse)
Pulse interval: 5.5 sec
Number of times of integration: 4,500
Shift basis: $CH_3$ (mmmm)=21.7 ppm The pentad fraction indicating the stereoregularity was calculated in percentage (%) based on the integrated value of intensity of each signal derived from combination (nmmm, mrrm and the like) of pentad of isotactic diad "meso (m)" and syndiotactic diad "racemo (r)". Regarding attribution of each signal derived from mmmm, mrrm and the like, for example, description of spectrum in "T. Hayashi et al., Polymer, vol. 29, p. 138 (1988)" and so on were referenced.

<Measurement of Heptane Insoluble (HI) Content>

Each PP resin was press-molded into a size of 10 mm×35 mm×0.3 mm, and a sample for measurement was fabricated by about 3 g. Next, about 150 mL of heptane was added thereto and Soxhlet extraction was performed for 8 hours. The heptane insoluble content was calculated from the sample masses before and after the extraction.

<Measurement of Melt Flow Rate (MFR)>

For each PP resin, melt flow rate (MFR) in the form of raw material resin pellets was measured in conformity with the condition M of JIS K 7210 using a melt indexer manufactured by TOYO SEIKI Co., Ltd. Specifically, 4 g of sample was first inserted into a cylinder set to a test temperature of 230° C. and preheated for 3.5 minutes under a load of 2.16 kg. Thereafter, the weight of the sample extruded through the bottom hole for 30 seconds was measured, and MFR (g/10 min) was determined. The measurement was repeated three times, and the average value thereof was taken as the measured value of MFR.

Example 1

<Fabrication of Cast Roll Stock Sheet>

A dry blend in which PP resin A [Mw=320,000, Mw/Mn=9.3, differential distribution value difference $D_M$=11.2, mesopentad fraction [mmmm]=95%, HI=97.3%, MFR=4.9 g/10 min, manufactured by Prime Polymer Co., Ltd.] and PP resin B [Mw=350,000, Mw/Mn=7.7, differential distribution value difference $D_M$=7.2, mesopentad fraction [mmmm]=96.5%, HI=98.6%, MFR=3.8 g/10 min, manufactured by KOREA PETROCHEMICAL IND CO., LTD.] were continuously weighed and mixed at a ratio of (resin A):(resin B)=60:40 was supplied to the extruder, melted at a resin temperature of 255° C., then extruded using a T-die, and wound around a metal drum having a surface temperature retained at 95° C. to be solidified to fabricate a cast roll stock sheet.

[Fabrication of Biaxially Stretched Polypropylene Film]

The cast roll stock sheet was preheated using the MD preheating roll group, then stretched in the MD direction using the MD stretching roll group, and then relaxed using the MD relaxing roll group. This was stretched 10 times in the TD direction at 163° C. using a tenter, relaxed, and heat-fixed, and a biaxially stretched polypropylene film having a thickness of 2.3 μm was wound up.

The MD stretching ratio was 4.5 times, the temperature of the first stage preheating roll was 85° C., the temperatures of the second and subsequent preheating rolls were 130° C., and the temperature of the MD stretching roll group was 146° C., the temperature of the MD relaxation roll group was 125° C., the close contact time with the MD preheating roll group was 7.4 seconds, the close contact time with the MD stretching roll group was 1.1 seconds, and the close contact time with the MD relaxation roll group was 1.1 seconds.

[Fabrication of Metallized Film Before Slit]

The biaxially stretched polypropylene film was unwound, and an oil mask for insulation margin was formed on the biaxially stretched polypropylene film. Next, an oil mask for pattern having a pattern corresponding to the electrode pattern was formed on the biaxially stretched polypropylene film on which an oil mask for insulation margin was formed. Next, metal deposition was performed on the biaxially stretched polypropylene film on which the oil mask for pattern was formed. The biaxially stretched polypropylene film after metal deposition was wound around the Bakelite core (core) that was a winding core. In this manner, a roll of a metallized film before slit was obtained.

In order to form the oil mask for insulation margin, vapor of Fomblin oil at about 120° C. was sprayed onto one of both surfaces of the biaxially stretched polypropylene film through a nozzle slit. The oil mask for insulation margin was formed in a stripe shape on the entire surface of the biaxially stretched polypropylene film (see FIG. 3).

The oil mask for pattern was formed using a plate roll. An oil mask for pattern having a pattern which largely corresponded to the electrode pattern of the metal deposition electrode in the region where the oil mask for insulation margin was not formed of the entire surface of the biaxially stretched polypropylene film.

In the metal deposition, aluminum was first deposited. The aluminum deposition was performed on the entire surface on which the oil mask for insulation margin and the oil mask for pattern were formed (hereinafter, referred to as "oil mask formed surface") between the two surfaces of the biaxially stretched polypropylene film. Zinc was then deposited to form a heavy edge portion. Zinc was deposited in the region where the heavy edge portion was to be formed of the oil mask formed surface. The metal deposition was performed while cooling the biaxially stretched polypropylene film using a cooling roll maintained at −24° C. In this manner, a biaxially stretched polypropylene film was allowed to pass through between the cooling roll and the evaporation source for metal deposition to deposit aluminum and zinc.

Example 2

A biaxially stretched polypropylene film and a metallized film before slit were fabricated by the same method as in Example 1 except that the biaxial stretching conditions were changed. Specifically, a metallized film before slit was fabricated under the same conditions as in Example 1 except that the MD stretching ratio was set to 4.6 times instead of 4.5 times and the close contact time with the MD preheating roll group was set to 7.8 seconds instead of 7.4 seconds. The close contact time with the MD preheating roll group was changed by changing the cast speed from that in Example 1.

Example 3

A biaxially stretched polypropylene film and a metallized film before slit were fabricated by the same method as in Example 1 except that the biaxial stretching conditions were changed. Specifically, a metallized film before slit was fabricated under the same conditions as in Example 1 except that the MD stretching ratio was set to 4.8 times instead of 4.5 times and the close contact time with the MD preheating roll group was set to 8.1 seconds instead of 7.4 seconds. The close contact time with the MD preheating roll group was changed by changing the cast speed from that in Example 1.

Example 4

A biaxially stretched polypropylene film and a metallized film before slit were fabricated by the same method as in Example 1 except that the biaxial stretching conditions were changed. Specifically, a metallized film before slit was fabricated under the same conditions as in Example 1 except that the MD stretching ratio was set to 5.0 times instead of 4.5 times and the close contact time with the MD preheating roll group was set to 8.4 seconds instead of 7.4 seconds. The close contact time with the MD preheating roll group was changed by changing the cast speed from that in Example 1.

Example 5

A biaxially stretched polypropylene film and a metallized film before slit were fabricated by the same method as in Example 1 except that the biaxial stretching conditions were changed. Specifically, a metallized film before slit was fabricated under the same conditions as in Example 1 except that the MD stretching ratio was set to 4.6 times instead of 4.5 times, the temperatures of the second and subsequent stage preheating rolls were set to 125° C. instead of 130° C., the temperature of the MD stretching roll group were set to 135° C. instead of 146° C., and the close contact time with the MD preheating roll group were set to 5.5 seconds instead of 7.4 seconds. The close contact time with the MD preheating roll group was changed by changing the cast speed from that in Example 1.

Example 6

A biaxially stretched polypropylene film and a metallized film before slit were fabricated by the same method as in Example 1 except that the biaxial stretching conditions were changed. Specifically, a metallized film before slit was fabricated under the same conditions as in Example 1 except that the MD stretching ratio were set to 4.6 times instead of 4.5 times, the temperature of the MD stretching roll group were set to 143° C. instead of 146° C., and the close contact time with the MD preheating roll group were set to 7.5 seconds instead of 7.4 seconds. The close contact time with the MD preheating roll group was changed by changing the cast speed from that in Example 1.

Example 7

A biaxially stretched polypropylene film and a metallized film before slit were fabricated by the same method as in Example 1 except that the biaxial stretching conditions were changed. Specifically, a metallized film before slit was fabricated under the same conditions as in Example 1 except that the MD stretching ratio were set to 4.6 times instead of 4.5 times, the temperature of the MD stretching roll group were set to 140° C. instead of 146° C., and the close contact time with the MD preheating roll group were set to 7.5 seconds instead of 7.4 seconds. The close contact time with the MD preheating roll group was changed by changing the cast speed from that in Example 1.

Example 8

A biaxially stretched polypropylene film and a metallized film before slit were fabricated by the same method as in Example 1 except that the biaxial stretching conditions were changed. Specifically, a metallized film before slit was fabricated under the same conditions as in Example 1 except that the MD stretching ratio were set to 5.5 times instead of 4.5 times, the temperatures of the second and subsequent stage preheating rolls were changed to 135° C. instead of 130° C., the close contact time with the MD preheating roll group were set to 9.5 seconds instead of 7.4 seconds, the close contact time with the MD stretching roll group were set to 1.8 seconds instead of 1.1 seconds, and the close contact time with the MD relaxation roll group were set to 1.8 seconds instead of 1.1 seconds. The respective close contact times were changed by changing the cast speed from that in Example 1.

Example 9

A biaxially stretched polypropylene film and a metallized film before slit were fabricated in the same manner as in Example 1 except that the thickness of the biaxially stretched polypropylene film was set to 2.5 μm.

Comparative Example 1

A biaxially stretched polypropylene film and a metallized film before slit were fabricated by the same method as in Example 1 except that the biaxial stretching conditions were changed. Specifically, a metallized film before slit was fabricated under the same conditions as in Example 1 except that the MD stretching ratio were set to 4.6 times instead of 4.5 times, the temperature of the MD stretching roll group were set to 128° C. instead of 146° C., and the close contact time with the MD preheating roll group were set to 7.5 seconds instead of 7.4 seconds. The close contact time with the MD preheating roll group was changed by changing the cast speed from that in Example 1.

Comparative Example 2

A biaxially stretched polypropylene film and a metallized film before slit were fabricated by the same method as in Example 1 except that the biaxial stretching conditions were changed. Specifically, a metallized film before slit was fabricated under the same conditions as in Example 1 except that the MD stretching ratio were set to 4.6 times instead of 4.5 times, the temperature of the first stage preheating roll were set to 70° C. instead of 85° C., the temperatures of the second and subsequent stage preheating rolls were changed to 110° C. instead of 130° C., and the close contact time with the MD preheating roll group were set to 7.5 seconds instead of 7.4 seconds. The close contact time with the MD preheating roll group was changed by changing the cast speed from that in Example 1.

Comparative Example 3

A biaxially stretched polypropylene film and a metallized film before slit were fabricated by the same method as in Example 1 except that the biaxial stretching conditions were changed. Specifically, a metallized film before slit was fabricated under the same conditions as in Example 1 except that the MD stretching ratio were set to 4.6 times instead of 4.5 times, the close contact time with the MD preheating roll group were set to 4.5 seconds instead of 7.4 seconds, the close contact time with the MD stretching roll group were set to 0.8 seconds instead of 1.1 seconds, and the close contact time with the MD relaxation roll group were set to 0.8 seconds instead of 1.1 seconds. The respective close contact times were changed by changing the cast speed from that in Example 1.

Comparative Example 4

A biaxially stretched polypropylene film and a metallized film before slit were fabricated by the same method as in Example 1 except that the biaxial stretching conditions were changed. Specifically, a metallized film before slit was fabricated under the same conditions as in Example 1 except that the MD stretching ratio were set to 4.4 times instead of 4.5 times, the temperature of the first stage preheating roll were set to 70° C. instead of 85° C., the temperatures of the second and subsequent stage preheating rolls were changed to 110° C. instead of 130° C., the temperature of the MD stretching roll group were set to 128° C. instead of 146° C., the close contact time with the MD preheating roll group were set to 4.1 seconds instead of 7.4 seconds, the close contact time with the MD stretching roll group were set to 0.8 seconds instead of 1.1 seconds, and the close contact time with the MD relaxation roll group were set to 0.8 seconds instead of 1.1 seconds. The respective close contact times were changed by changing the cast speed from that in Example 1.

Comparative Example 5

A biaxially stretched polypropylene film and a metallized film before slit were fabricated by the same method as in Example 1 except that the biaxial stretching conditions were changed. Specifically, a metallized film before slit was fabricated under the same conditions as in Example 1 except that the MD stretching ratio were set to 6.0 times instead of 4.5 times, the close contact time with the MD preheating roll group were set to 4.5 seconds instead of 7.4 seconds, the close contact time with the MD stretching roll group were set to 0.8 seconds instead of 1.1 seconds, and the close contact time with the MD relaxation roll group were set to 0.8 seconds instead of 1.1 seconds. The respective close contact times were changed by changing the cast speed from that in Example 1.

Comparative Example 6

It was attempted to fabricate a biaxially stretched polypropylene film and a metallized film before slit by the same method as in Example 1 except that the biaxial stretching conditions were changed. Specifically, it was attempted to fabricate a metallized film before slit under the same conditions as in Example 1 except that the MD stretching ratio were set to 6.5 times instead of 4.5 times, the close contact time with the MD preheating roll group were set to 7.5 seconds instead of 7.4 seconds, the close contact time with the MD stretching roll group were set to 0.7 seconds instead of 1.1 seconds, and the close contact time with the MD relaxation roll group were set to 0.7 seconds instead of 1.1 seconds. The respective close contact times were changed by changing the cast speed from that in Example 1.

However, it was not able to fabricate a biaxially stretched polypropylene film since breakdown occurred during biaxial stretching, specifically when the cast roll stock sheet was stretched in the MD direction.

Comparative Example 7

A biaxially stretched polypropylene film and a metallized film before slit were fabricated by the same method as in Example 1 except that the biaxial stretching conditions were changed. Specifically, a metallized film before slit was fabricated under the same conditions as in Example 1 except that the close contact time with the MD preheating roll group were set to 10.8 seconds instead of 7.4 seconds, the close contact time with the MD stretching roll group were set to 1.6 seconds instead of 1.1 seconds, and the close contact time with the MD relaxation roll group were set to 1.6 seconds instead of 1.1 seconds. The respective close contact times were changed by changing the cast speed from that in Example 1.

Comparative Example 8

A biaxially stretched polypropylene film and a metallized film before slit were fabricated by the same method as in Example 1 except that the biaxial stretching conditions were changed. Specifically, a metallized film before slit was fabricated under the same conditions as in Example 1 except that the MD stretching ratio were set to 4.6 times instead of 4.5 times, the close contact time with the MD preheating roll group were set to 13.7 seconds instead of 7.4 seconds, the close contact time with the MD stretching roll group were set to 2.1 seconds instead of 1.1 seconds, and the close contact time with the MD relaxation roll group were set to 2.1 seconds instead of 1.1 seconds. The respective close contact times were changed by changing the cast speed from that in Example 1.

Reference Comparative Example

A biaxially stretched polypropylene film and a metallized film before slit were fabricated in the same manner as in Example 1 except that the thickness of the biaxially stretched polypropylene film was set to 4.6 μm. When a capacitor was fabricated by the same method as in Example 1 except that this metallized film before slit was used (that is, when a capacitor was fabricated by the same method as described in the item <fabrication of capacitor and measurement of capacitance> described later), the capacitance per unit volume of the capacitor was theoretically only 0.25 times the capacitance per unit volume of the capacitor obtained in Example 1. For this reason, the biaxially stretched polypropylene film of the Reference Comparative Example is significantly inferior to the biaxially stretched polypropylene films of Examples 1 to 9 in the capacitance of capacitor and the capacitance per unit volume.

<Measurement of Thickness>

The thickness was measured using a paper thickness measuring instrument MEI-11 (measuring pressure: 100 kPa, descent speed: 3 mm/sec, measuring terminal φ=16 mm, measuring force: 20.1 N) manufactured by CITIZEN FINEDEVICE CO., LTD. in an environment of a temperature of 23° C.±2° C. and a humidity of 50%±5% RH. The sample was cut out from the roll while 10 or more sheets thereof were stacked and was handled so that the film did not wrinkle and the air did not enter the film at the time of cutting out. The measurement was performed five times for a ten sheet-stacked sample, and the average value for the five times of measurement was divided by 10 to calculate the thickness.

<Tensile Fracture Stress ($\sigma_{b125}$) at 125° C. in MD Direction>

The tensile fracture stress ($\sigma_{b125}$) at 125° C. in the MD direction was measured in conformity with JIS K 7127: 1999. First, a rectangular sample having a length of 150 mm and a width of 10 mm was cut out from the biaxially stretched polypropylene films of Examples and Comparative Examples. At this time, the sample was cut out so that the MD direction was the length direction. The sample was set on a chuck in the oven heated to 125° C. in a tensile testing instrument with oven (TENSILON Universal Testing Instrument RTG-1210 manufactured by A&D Company) with a distance between chucks of 50 mm. Next, the sample was preheated for 1 minute and subjected to a tensile test at a test speed of 300 mm/min. The tensile fracture stress ($\sigma_{b125}$) at 125° C. was calculated by dividing the load value at the maximum strain at the time of the tensile test by the sectional area of the sample before the tensile test (sample thickness before tensile test×width 10 mm). Tensile test was performed five times for each sample. The average value thereof is presented in Table 1. The tensile fracture stress is called a tensile fracture strength, a tensile breakdown stress, or a tensile breakdown strength in some cases.

<Tensile Fracture Stress ($\sigma_{b135}$) at 135° C. in MD Direction>

A tensile test was performed by the same method as in the tensile fracture stress ($\sigma_{b125}$) at 125° C. except that the temperature inside the oven were set to 135° C. instead of 125° C., and the tensile fracture stress ($\sigma_{b135}$) at 135° C. was calculated. Tensile test was performed five times for each sample. The average value thereof is presented in Table 1.

TABLE 1

| | | MD stretching condition | | | | | | | | | |
| --- | --- | --- | --- | --- | --- | --- | --- | --- | --- | --- | --- |
| | | Temperature | | | | Close contact time | | | Tensile fracture stress | | |
| | | First stage MD | Second and subsequent stage MD | MD | MD | Close contact time with MD | Close contact time with MD | Close contact time with MD | | | |
| | MD stretching ratio | preheating roll ° C. | preheating roll ° C. | stretching roll ° C. | relaxation roll ° C. | preheating roll group s | stretching roll group s | relaxation roll group s | $\sigma_{b125}$-$\sigma_{b135}$ MPa | $\sigma_{b125}$ MPa | $\sigma_{b135}$ MPa |
| Example 1 | 4.5 | 85 | 130 | 146 | 125 | 7.4 | 1.1 | 1.1 | 8 | 93 | 85 |
| Example 2 | 4.6 | 85 | 130 | 146 | 125 | 7.8 | 1.1 | 1.1 | 7 | 95 | 88 |
| Example 3 | 4.8 | 85 | 130 | 146 | 125 | 8.1 | 1.1 | 1.1 | 11 | 103 | 92 |
| Example 4 | 5.0 | 85 | 130 | 146 | 125 | 8.4 | 1.1 | 1.1 | 13 | 106 | 93 |
| Example 5 | 4.6 | 85 | 125 | 135 | 125 | 5.5 | 1.1 | 1.1 | 14 | 109 | 95 |
| Example 6 | 4.6 | 85 | 130 | 143 | 125 | 7.5 | 1.1 | 1.1 | 10 | 87 | 77 |
| Example 7 | 4.6 | 85 | 130 | 140 | 125 | 7.5 | 1.1 | 1.1 | 13 | 98 | 85 |
| Example 8 | 5.5 | 85 | 135 | 146 | 125 | 9.5 | 1.8 | 1.8 | 14 | 120 | 106 |
| Example 9 | 4.5 | 85 | 130 | 146 | 125 | 7.4 | 1.1 | 1.1 | 9 | 99 | 90 |
| Comparative Example 1 | 4.6 | 85 | 130 | 128 | 125 | 7.5 | 1.1 | 1.1 | 21 | 113 | 92 |
| Comparative Example 2 | 4.6 | 70 | 110 | 146 | 125 | 7.5 | 1.1 | 1.1 | 16 | 106 | 90 |
| Comparative Example 3 | 4.6 | 85 | 130 | 146 | 125 | 4.5 | 0.8 | 0.8 | 17 | 100 | 83 |
| Comparative Example 4 | 4.4 | 70 | 110 | 128 | 125 | 4.1 | 0.8 | 0.8 | 18 | 85 | 67 |
| Comparative Example 5 | 6.0 | 85 | 130 | 146 | 125 | 4.5 | 0.8 | 0.8 | 20 | 130 | 110 |

TABLE 1-continued

| | | MD stretching condition | | | | | | | | | |
|---|---|---|---|---|---|---|---|---|---|---|---|
| | | Temperature | | | | Close contact time | | | Tensile fracture stress | | |
| | MD stretching ratio | First stage MD preheating roll °C | Second and subsequent stage MD preheating roll °C | MD stretching roll °C | MD relaxation roll °C | Close contact time with MD preheating roll group s | Close contact time with MD stretching roll group s | Close contact time with MD relaxation roll group s | $\sigma_{b125}-\sigma_{b135}$ MPa | $\sigma_{b125}$ MPa | $\sigma_{b135}$ MPa |
| Comparative Example 6 | 6.5 | 85 | 130 | 146 | 125 | 7.5 | 0.7 | 0.7 | — | — | — |
| Comparative Example 7 | 4.5 | 85 | 130 | 146 | 125 | 10.8 | 1.6 | 1.6 | 6 | 75 | 69 |
| Comparative Example 8 | 4.6 | 85 | 130 | 146 | 125 | 13.7 | 2.1 | 2.1 | 5 | 70 | 65 |

<Tensile Fracture Stress ($\sigma_{b23}$) at 23° C. in MD Direction>

A tensile test was performed by the same method as in the tensile fracture stress ($\sigma_{b125}$) at 125° C. except that the temperature inside the oven was set to 23° C. instead of 125° C., and the tensile fracture stress ($\sigma_{b23}$) at 23° C. was calculated. Tensile test was performed five times for each sample. The average value thereof is presented in Table 2.

<Thermal Shrinkage at 125° C. in MD Direction>

First, a rectangle having a length of 130 mm and a width of 20 mm was cut out from the biaxially stretched polypropylene films of Examples and Comparative Examples to fabricate a sample for measurement. At this time, the sample was cut out so that the length direction of the sample coincided with the MD direction. Three samples for measurement were prepared. Next, the place at a length of 100 mm was measured with a ruler, and a marked line was marked on the place. Thereafter, the three samples for measurement were hung in a hot air circulation type constant temperature bath at 125° C. with no load and retained for 15 minutes. After that, the three samples for measurement were cooled at room temperature (23° C.), the interval between the marked lines was measured with a ruler, and the thermal shrinkage (%) in the MD direction was calculated using the following equation.

Thermal shrinkage (%)=[(marked line interval before heating−marked line interval after heating)/(marked line interval before heating)]×100

The average value of the measured values for three samples for measurement was taken as the thermal shrinkage (%) in the MD direction.

Measurement conditions other than those described here conformed to JIS C 2151: 2019 "25. Dimensional Change". The results are presented in Table 2.

<Thermal Shrinkage at 135° C. in MD Direction>

The measurement was performed by the same method as in the thermal shrinkage at 125° C. in the MD direction except that the temperature of the hot air circulation type constant temperature bath was set to 135° C. instead of 125° C. The results are presented in Table 2.

<Dimensional Change Rate at 125° C. in MD Direction and Dimensional Change Rate at 135° C. in MD Direction>

The dimensional change rate in the MD direction was determined by temperature modulation TMA measurement using a thermomechanical analyzer ("SS-6000" manufactured by Seiko Instruments Inc.).

Samples were fabricated by cutting out strips from the biaxially stretched polypropylene films of Examples and Comparative Examples so as to have a width of 30 mm in the measurement direction and a width of 4 mm in the direction orthogonal to the measurement direction. Three samples for measurement were prepared. At this time, the sample was cut out so that the measurement direction of the sample coincided with the MD direction. As the measurement conditions, the distance between chucks was 15 mm, the measurement temperature range was 25° C. to 150° C., the programming rate was 10° C./min, and the tensile load continuously applied to the sample piece was 20 mN. The dimensional change rates in the MD direction were calculated from the distance between chucks (mm) when the temperature inside the furnace reached 125° C. and the distance between chucks (mm) when the temperature reached 135° C. using the following equations.

[Dimensional change rate at 125° C. in MD direction (%)]=[(distance between chucks at 125° C.−distance between chucks at 25° C.)/distance between chucks at 25° C.]×100

[Dimensional change rate at 135° C. in MD direction (%)]=[(distance between chucks at 135° C.−distance between chucks at 25° C.)/distance between chucks at 25° C.]×100

The average values of the measured values for three samples for measurement at 125° C. and 135° C. were taken as the dimensional change rate at 125° C. in the MD direction and the dimensional change rate at 135° C. in the MD direction, respectively.

The dimensional change rate becomes positive (plus) when the film dimensions increase (expand) as the temperature rises and becomes negative (minus) when the film dimensions decrease (shrink) as the temperature rises. The results are presented in Table 2.

<Measurement of Crystallite Size>

The crystallite size of the biaxially stretched polypropylene films according to Examples and Comparative Examples was measured using an XRD (wide angle X-ray diffraction) apparatus under the following conditions in a state where fifteen films were stacked.

Measuring machine: X-ray diffraction apparatus "MiniFlex 300" manufactured by Rigaku Corporation.

X-ray output: 30 kV, 10 mA

Irradiated X-ray: monochromator monochromatic CuKα ray (wavelength: 0.15418 nm)

Detector: scintillation counter
Goniometer scanning: 2θ/θ ganged scanning

From the acquired data, a half value width of a diffraction reflection peak in the a crystal (040) face was calculated after optimization with the split-type pseudo-Voight function using an analytical computer and integrated powder X-rays analysis software PDXL (Ver. 2.1.3.4) regularly attached to the apparatus. The crystallite size was determined from the half value width using the Scherrer's equation (D=K×λ/(β×cos θ)).

In the Scherrer's equation, D denotes the crystallite size (nm), K denotes a constant (form factor: 0.94 is adopted in the present Example), z denotes the wavelength of X-ray used (nm), B denotes the determined half value width, and θ denotes the diffraction Bragg angle. As λ, 0.15418 nm was used. The results are presented in Table 2.

TABLE 2

|  | $\sigma_{b23}$ MPa | MD thermal shrinkage at 125° C. $S_{b125}$ % | MD thermal shrinkage at 135° C. $S_{b135}$ % | Difference $(S_{b125}-S_{b135})$ % | MD dimensional change rate at 125° C. $D_{b125}$ % | MD dimensional change rate at 135° C. $D_{b135}$ % | Difference $(D_{b125}-D_{b135})$ % | Crystallite size nm |
|---|---|---|---|---|---|---|---|---|
| Example 1 | 173 | 5.8 | 7.7 | −1.9 | −1.3 | −1.9 | 0.6 | 11.98 |
| Example 2 | 182 | 5.8 | 7.8 | −2.0 | −1.2 | −1.8 | 0.6 | 11.85 |
| Example 3 | 200 | 5.9 | 7.9 | −2.0 | −1.6 | −2.2 | 0.6 | 11.72 |
| Example 4 | 205 | 5.9 | 8.0 | −2.1 | −1.7 | −2.3 | 0.6 | 11.62 |
| Example 5 | 208 | 6.0 | 7.9 | −1.9 | −1.9 | −2.6 | 0.7 | 11.58 |
| Example 6 | 161 | 6.2 | 8.2 | −2.0 | −1.9 | −2.7 | 0.8 | 11.98 |
| Example 7 | 159 | 4.7 | 6.8 | −2.1 | −1.0 | −1.4 | 0.4 | 11.70 |
| Example 8 | 220 | 6.3 | 8.2 | −1.9 | −1.8 | −2.4 | 0.6 | 11.48 |
| Example 9 | 185 | 5.8 | 7.9 | −2.1 | −1.1 | −1.7 | 0.6 | 11.80 |
| Comparative Example 1 | 215 | 6.0 | 8.0 | −2.0 | −2.3 | −3.3 | 1.0 | 11.56 |
| Comparative Example 2 | 191 | 5.9 | 7.8 | −1.9 | −1.3 | −1.8 | 0.5 | 11.76 |
| Comparative Example 3 | 185 | 5.9 | 7.9 | −2.0 | −1.2 | −1.9 | 0.7 | 11.78 |
| Comparative Example 4 | 150 | 5.5 | 7.5 | −2.0 | −1.1 | −1.7 | 0.6 | 12.17 |
| Comparative Example 5 | 235 | 7.2 | 9.3 | −2.1 | −2.6 | −3.6 | 1.0 | 11.41 |
| Comparative Example 6 | — | — | — | — | — | — | — | — |
| Comparative Example 7 | 153 | 5.2 | 6.7 | −1.5 | −0.9 | −1.5 | 0.6 | 12.03 |
| Comparative Example 8 | 148 | 5.0 | 6.5 | −1.5 | −0.8 | −1.3 | 0.5 | 12.25 |

<Fabrication of Capacitor and Measurement of Capacitance>

The metallized films before slit (metal layer-integrated polypropylene films) fabricated in Examples and Comparative Examples were slit to a width of 60 mm. Next, two metal layer-integrated polypropylene films were combined together. The combined metal layer-integrated polypropylene films were wound at a winding tension of 250 g, a contact pressure of 880 g, and a winding speed of 4 m/s using an automatic winding machine Model 3KAW-N2 manufactured by KAIDO MFG. CO., LTD. Winding was performed 1137 turns when the thickness of the biaxially stretched polypropylene film was 2.3 μm and 1076 turns when the thickness was 2.5 μm. The wound element was subjected to a heat treatment at 120° C. for 15 hours while being pressed at a load of 5.9 kg/cm². Thereafter, zinc metal was thermal sprayed to the element end face. As the thermal spraying conditions, the feed speed was 15 mm/s, the thermal spraying voltage was 22 V, and the thermal spraying pressure was 0.3 MPa, and the thermal spraying was performed so that the thickness was 0.7 mm. A flat capacitor was thus obtained. The lead wire was soldered to the end face of the flat capacitor. Thereafter, the flat capacitor was sealed with an epoxy resin. The epoxy resin was cured by performing heating at 90° C. for 2.5 hours and then further performing heating at 120° C. for 2.5 hours. The capacitance of the fabricated capacitor element was 75 pF (±2 μF).

<Evaluation on Wrinkle Defect in Wound Shape>

The appearance (also referred to as the wound shape) of the film roll of the metallized films before slit of Examples and Comparative Examples was visually observed, and the state of wound shape was evaluated. Specifically, it was judged whether or not the film roll of the metallized film before slit had creases. The results are presented in Table 3.

<Evaluation on Deposited Film Unevenness>

From the roll-shaped metallized films before slit of Examples and Comparative Examples, one full-width film for one roll was peeled off, the metallized film before slit which had been peeled off was visually observed by applying the light from a fluorescent lamp from the lower side of the film, and it was evaluated whether or not the deposited film was uniformly deposited on the entire metallized film before slit. When a state where the deposited film was deposited so as to have a wrinkle shape, a state where the deposited film thickness is shaded, or both of these states are observed, it was judged to be defective. The results are presented in Table 3.

Capacitor elements were fabricated using the metallized films before slit fabricated in Examples and Comparative Examples, the capacitor elements were subjected to two marginal tests (temperature marginal test and voltage marginal test), and the capacitance change rate with elapsed time was measured. For each example in which wrinkle defects in the wound shape and the deposited film unevenness were generated, a capacitor element was fabricated at a normal place excluding the deposition defect generated place and tested. As the method for fabricating the capacitor element, the method described in the section "fabrication of capacitor and measurement of capacitance" was adopted.

<Temperature Marginal Test (115° C., 700 V)>

After the capacitor element was preheated at 115° C. for 1 hour, the capacitance was measured using LCR high tester 3522-50 manufactured by HIOKI E.E. CORPORATION. This capacitance is hereinafter referred to as the initial capacitance and is also referred to as $C_0$. Next, in a constant temperature bath at 115° C., a voltage of 700 V DC was continuously applied to the capacitor element for 100 hours. Next, the capacitance after the voltage was continuously applied for 100 hours was measured (the capacitance is also referred to as the capacitance after elapse of 100 hours and is also referred to as $C_{100}$). The capacitance change rate (capacitance change rate after elapse of 100 hours) was calculated. This rate of change was calculated by the following equation.

Capacitance change rate after elapse of 100 hours= [(capacitance change rate after elapse of 100 hours−initial capacitance)/initial capacitance]×100

The capacitance change rate after elapse of 100 hours is also referred to as $\Delta C$, and $\Delta C = \{(C_{100}-C_0)/C_0\} \times 100$.

The capacitor element was returned to the constant temperature bath, a voltage of 700 V DC was continuously applied to the capacitor element for 50 hours, and then the capacitor element was taken out, the capacitance was measured, and the rate of change with respect to the initial capacitance ($C_0$) was calculated. This series of operations was repeated until the rate of change was out of the range of −5% to +5%. In this manner, the elapsed time when the rate of change was out of the range of −5% to +5% (hereinafter, may be referred to as "failure time") was determined.

The rate of change ($\Delta C$) after elapse of 100 hours was evaluated by the average value for five capacitor elements. When the rate of change ($\Delta C$) after elapse of 100 hours was out of the range of −5% to +5%, the evaluation was judged to be defective. The failure time was evaluated as the time of a capacitor element which had the shortest time until the rate of change was out of the range of −5% to +5% among the five capacitor elements. When the failure time was 450 hours or less, the evaluation was judged to be defective. When a short circuit occurred in even one of the five capacitor elements, the evaluation was judged to be defective.

The capacitance change rate ($\Delta C$) after elapse of 100 hours and the failure time are presented in Table 3.

<Voltage Marginal Test (105° C., 800 V)>

The same method as that for the temperature marginal test was adopted except that the preheating of the capacitor element was performed at 105° C. instead of 115° C., the temperature of the constant temperature bath was set to 105° C. instead of 115° C., and the voltage applied to the capacitor element was set to 800 V instead of 700 V, and the capacitance change rate ($\Delta C$) and the failure time were measured.

TABLE 3

| | Marginal test | | | | Visual evaluation | |
| --- | --- | --- | --- | --- | --- | --- |
| | Temperature marginal test | | Voltage marginal test | | | |
| | Capacitance change rate after elapse of 100 hours ($\Delta C$) % | Failure time h | Capacitance change rate after elapse of 100 hours ($\Delta C$) % | Failure time h | Presence or absence of wrinkle defect | Presence or absence of deposited film unevenness |
| Example 1 | −2.0 | 600 | −2.3 | 550 | Absence | Absence |
| Example 2 | 1.0 | 750 | −1.2 | 550 | Absence | Absence |
| Example 3 | −0.2 | 800 | −1.0 | 700 | Absence | Absence |
| Example 4 | 0.1 | 850 | −0.6 | 750 | Absence | Absence |
| Example 5 | 1.4 | 800 | −2.0 | 650 | Absence | Absence |
| Example 6 | −1.5 | 650 | −2.5 | 550 | Absence | Absence |
| Example 7 | −1.0 | 750 | −2.6 | 550 | Absence | Absence |
| Example 8 | −1.3 | 700 | −2.4 | 600 | Absence | Absence |
| Example 9 | −0.5 | 650 | −1.9 | 600 | Absence | Absence |
| Comparative Example 1 | −1.0 | 650 | −1.9 | 550 | Presence | Presence |
| Comparative Example 2 | 0.5 | 600 | −1.5 | 500 | Presence | Presence |

TABLE 3-continued

| | Marginal test | | | | Visual evaluation | |
|---|---|---|---|---|---|---|
| | Temperature marginal test | | Voltage marginal test | | | |
| | Capacitance change rate after elapse of 100 hours (ΔC) % | Failure time h | Capacitance change rate after elapse of 100 hours (ΔC) % | Failure time h | Presence or absence of wrinkle defect Absence | Presence or absence of deposited film unevenness Absence |
| Comparative Example 3 | −3.0 | 500 | −4.2 | 350 | Presence | Presence |
| Comparative Example 4 | −4.1 | 250 | Short-circuit breakdown | | Presence | Presence |
| Comparative Example 5 | −1.0 | 800 | −3.5 | 700 | Presence | Presence |
| Comparative Example 6 | — | — | — | — | — | — |
| Comparative Example 7 | −3.5 | 550 | −5.1 | 300 | Absence | Absence |
| Comparative Example 8 | −4.2 | 500 | Short-circuit breakdown | | Absence | Absence |

In Examples 1 to 9, not only wrinkle defects in the wound shape and deposited film unevenness were not observed but also the failure time exceeded 450 hours in both the temperature marginal test and the voltage marginal test. On the other hand, in Comparative Examples 1 to 5, both wrinkle defects and deposited film unevenness were observed. In Comparative Example 3, the failure time in the voltage marginal test was as short as 350 hours. In Comparative Example 4, short-circuit breakdown occurred in the voltage marginal test.

When Example 3 and Comparative Example 1 are compared with each other, the tensile fracture stress ($\sigma_{b135}$) at 135° C. was the same for both but the failure time in Example 3 was longer than the failure time in Comparative Example 1 in the two marginal tests. It is considered that the reason for this is that the tensile fracture stress difference ($\sigma_{b125}-\sigma_{b135}$) in Example 3 is smaller than the tensile fracture stress difference in Comparative Example 1, thus the internal structure of the biaxially stretched polypropylene film is hardly collapsed by heating to increase the temperature to the test temperatures (115° C. in the temperature marginal test and 105° C. in the voltage marginal test) and a decrease in capacitance hardly proceeds in Example 3.

The tensile fracture stress ($\sigma_{b135}$) at 135° C. in Example 4 was 93 MPa and this was higher than 85 MPa in Example 7, and the failure time in Example 4 was longer than the failure time in Example 7 in the two marginal tests. It is considered that the internal structure of the biaxially stretched polypropylene film in Example 4 is firmer than that in Example 7. In this manner, the correlation that the internal structure of the biaxially stretched polypropylene film is firmer as the tensile fracture stress ($\sigma_{b135}$) at 135° C. is higher can be read from the comparison between Example 4 and Example 7.

On the other hand, the tensile fracture stress ($\sigma_{b135}$) at 135° C. in Example 8 was 106 MPa and this was higher than 95 MPa in Example 5, but the failure time in Example 8 was shorter than the failure time in Example 5 in the two marginal tests. This is considered to suggest that the correlation between the tensile fracture stress ($\sigma_{b135}$) at 135° C. and the strength of internal structure of biaxially stretched polypropylene film may start to break at a tensile fracture stress ($\sigma_{b135}$) of near 106 MPa at 135° C.

In Comparative Example 3, the tensile fracture stress ($\sigma_{b135}$) at 135° C. was 70 MPa or more but the failure time in the voltage marginal test was as short as 350 hours. It is considered that this is because in Comparative Example 3, the tensile fracture stress difference ($\sigma_{b125}-\sigma_{b135}$) is as large as 17 MPa, thus the internal structure of the biaxially stretched polypropylene film is easily collapsed by heating to increase the temperature to the test temperatures (105° C.) in the voltage marginal test, and a decrease in capacitance is likely to proceed.

DESCRIPTION OF REFERENCE SIGNS

5 Metallized film
6 Metallized film before slit
10 Biaxially stretched polypropylene film
21 Insulation margin
30 Metal layer
31 Heavy edge portion
32 Active portion
51 One end portion of metallized film
52 Other end portion of metallized film
300 Metal layer

The invention claimed is:
1. A biaxially stretched polypropylene film produced by:
  obtaining a cast roll stock sheet produced by melting and extruding a resin;
  preheating the cast roll stock sheet using a machine direction (MD) preheating roll group, wherein temperature of the MD preheating roll group during a first stage in said preheating is set to 60-95° C., temperature of the MD preheating roll group during a second stage in said preheating is set to 115-138° C., and contact time with the MD preheating roll group during the second stage of said preheating is set to 5-10 seconds;
  stretching the cast roll stock sheet in the MD direction using a MD stretching roll group, wherein a MD stretching ratio is set to 4.5-5.5 times, and temperature of the MD stretching roll group is set to 130-150° C., contact time with the MD stretching roll group is set to 1-2 seconds during said stretching; and
  relaxing the cast roll stock sheet using a MD relaxing roll group, wherein temperature of the MD relaxing roll group is set to 120-128° C. and contact time with the MD relaxing roll group is set to 1-2 seconds during said relaxing, wherein the biaxially stretched polypropylene film has:
a thickness of from 1.0 μm to 3.5 μm;
a tensile fracture stress of 70 MPa or more at 135° C. in a first direction; and
a difference between a tensile fracture stress at 125° C. in the first direction and a tensile fracture stress at 135° C. in the first direction of 0 MPa or more and 15 Mpa or less.

2. The biaxially stretched polypropylene film according to claim 1, wherein a dimensional change rate at 135° C. in the first direction is −3.2% or more.

3. The biaxially stretched polypropylene film according to claim 1, wherein a difference between a dimensional change rate at 125° C. in the first direction and a dimensional change rate at 135° C. in the first direction is 0% or more and 1.5% or less.

4. The biaxially stretched polypropylene film according to claim 1, wherein a crystallite size is 12.20 nm or less.

5. The biaxially stretched polypropylene film according to claim 1, which is used for a capacitor.

6. A metallized film comprising:
the biaxially stretched polypropylene film according to claim 1; and
a metal layer laminated on at least one surface of the biaxially stretched polypropylene film.

7. A metallized film roll formed by winding the metallized film according to claim 6.

8. A film capacitor comprising the metallized film according to claim 6, wherein said metallized film is wound or laminated.

9. A method of producing a biaxially stretched polypropylene film, comprising:
obtaining a cast roll stock sheet produced by melting and extruding a resin:
preheating the cast roll stock sheet using a machine direction (MD) preheating roll group, wherein temperature of the MD preheating roll group during a first stage in said preheating is set to 60-95° C., temperature of the MD preheating roll group during a second stage in said preheating is set to 115-138° C., and contact time with the MD preheating roll group during the second stage of said preheating is set to 5-10 seconds:
stretching the cast roll stock sheet in the MD direction using a MD stretching roll group, wherein a MD stretching ratio is set to 4.5-5.5 times, and temperature of the MD stretching roll group is set to 130-150° C., contact time with the MD stretching roll group is set to 1-2 seconds during said stretching;
relaxing the cast roll stock sheet using a MD relaxing roll group, wherein temperature of the MD relaxing roll group is set to 120-128° C. and contact time with the MD relaxing roll group is set to 1-2 seconds during said relaxing,
wherein the biaxially stretched polypropylene film has a tensile fracture stress of 70 MPa or more at 135° C. in a first direction,
wherein a difference between a tensile fracture stress at 125° C. in the first direction of the biaxially stretched polypropylene film and a tensile fracture stress at 135° C. in the first direction of the biaxially stretched polypropylene film is 0-15 MPa.

10. The method of claim 9, wherein the temperature of the MD preheating roll group during the second stage in said preheating is set to 125-135° C.

11. The method of claim 9, wherein the contact time with the MD preheating roll group during the second stage in said preheating is set to 5.5-9.5 seconds.

12. The method of claim 9, wherein the MD stretching ratio in said stretching is set to 4.6-5.5 times.

13. The method of claim 9, wherein the temperature of the MD stretching roll group in said stretching is set to 135-146° C.

14. The method of claim 9, wherein the contact time with the MD stretching roll group in said stretching is set to 1.1-1.8 seconds.

15. The method of claim 9, wherein the contact time with the MD relaxing roll group in said relaxing is set to 1.1-1.8 seconds.

16. The method of claim 9, wherein the difference between the tensile fracture stress at 125° C. in the first direction of the biaxially stretched polypropylene film and the tensile fracture stress at 135° C. in the first direction of the biaxially stretched polypropylene film is 7-15 MPa.

* * * * *

UNITED STATES PATENT AND TRADEMARK OFFICE
CERTIFICATE OF CORRECTION

PATENT NO. : 11,961,683 B2
APPLICATION NO. : 17/261826
DATED : April 16, 2024
INVENTOR(S) : Yoshimune Okuyama et al.

It is certified that error appears in the above-identified patent and that said Letters Patent is hereby corrected as shown below:

In the Specification

Column 2, Line 59, delete "Mpa" and insert -- MPa --.

Column 12, Line 9, delete "guardcolumn" and insert -- guard column --.

Column 23, Line 49, delete "(450" and insert -- (45° --.

Column 23, Line 55, delete "(nmmm," and insert -- (mmmm, --.

Column 33, Line 4, delete "the a" and insert -- the $\alpha$ --.

Column 34, Line 5, delete "z" and insert -- $\lambda$ --.

Column 34, Line 6, delete "B" and insert -- $\beta$ --.

Column 34, Line 67, delete "pF" and insert -- $\mu$F --.

Column 38, Line 28, delete "$(\sigma_{b125}-\sigma_{135})$" and insert -- $(\sigma_{b125}-\sigma_{b135})$ --.

In the Claims

Column 39, Line 10 (approx.), Claim 1, delete "Mpa" and insert -- MPa --.

Column 39, Line 38, Claim 9, delete "resin:" and insert -- resin; --.

Column 40, Line 2, Claim 9, delete "seconds:" and insert -- seconds; --.

Signed and Sealed this
Tenth Day of September, 2024

*Katherine Kelly Vidal*
Katherine Kelly Vidal
*Director of the United States Patent and Trademark Office*